United States Patent [19]

Mizutani et al.

[11] Patent Number: 4,979,037

[45] Date of Patent: Dec. 18, 1990

[54] APPARATUS FOR DEMODULATING SUB-NYQUIST SAMPLED VIDEO SIGNAL AND DEMODULATING METHOD THEREFOR

[75] Inventors: Yosuke Mizutani; Takehiko Asano; Syuji Yanase; Shinichiro Kitagawa; Akihiko Yamashita, all of Gifu, Japan

[73] Assignee: Sanyo Electric Co., Ltd., Moriguchi, Japan

[21] Appl. No.: 338,088

[22] Filed: Apr. 14, 1989

[30] Foreign Application Priority Data

Apr. 15, 1988 [JP] Japan .................................. 63-94216
Jun. 14, 1988 [JP] Japan ................................ 63-146311
Jan. 24, 1989 [JP] Japan ..................................... 1-15709

[51] Int. Cl.$^5$ .......................... H04N 7/12; H04N 7/18
[52] U.S. Cl. ..................................... 358/133; 358/136; 358/138; 358/105
[58] Field of Search .............. 358/133, 135, 136, 138, 358/105, 314, 336

[56] References Cited

U.S. PATENT DOCUMENTS

| | | | |
|---|---|---|---|
| 4,383,272 | 5/1983 | Netravali et al. | 358/136 |
| 4,571,618 | 2/1986 | Hatori et al. | 358/136 |
| 4,692,801 | 9/1987 | Ninomiya et al. | 358/136 |
| 4,743,965 | 5/1988 | Yamada et al. | 358/138 |
| 4,760,446 | 7/1988 | Ninomiya | 358/136 |

OTHER PUBLICATIONS

NHK Research Laboratory Monthly Review, Jul. 1984, pp. 275–285.

Nikkei Electronics, Nov. 2, 1987, No. 433, pp. 189 to 212.

*Primary Examiner*—John K. Peng
*Attorney, Agent, or Firm*—Armstrong, Nikaido, Marmelstein, Kubovcik & Murray

[57] ABSTRACT

An apparatus (MD) for reproducing, by a low-frequency replacement method, a noise-free high definition video (MUSE) signal obtained by band-compressing the high definition video signal in a time-compressed integration Sub-Nyquist encoding system so as to include no aliasing noise in a low-frequency component below 4 MHz. This reproducing apparatus includes a converter (3) for converting a reproduced or received MUSE signal into digital data and a memory (7) for outputting feedback data in which preceding by two fields and data preceding by four fields with respect to the current field are alternately arranged, a circuit (6; 33) for replacing/non-replacing the data preceding by four fields by first data corresponding to the current field data from the current field data and the feedback data and deriving a data train in which the first data and the data preceding by two fields are alternately arranged. Output from the data train deriving circuit is employed to be converted to composite data by a mixture 11, and a circuit (LC) for replacing the low-frequency component of the current field data or the first data with the low-frequency component of the composite data. The reproducing apparatus further includes a circuit (15, 18, 19, 19, 54; 15, 35; 34, 15', 54') for inhibiting this low-frequency replacement as well as replacement of the data preceding by four fields and the first data upon generation of noise such as dropout in the reproduced MUSE signal.

21 Claims, 17 Drawing Sheets

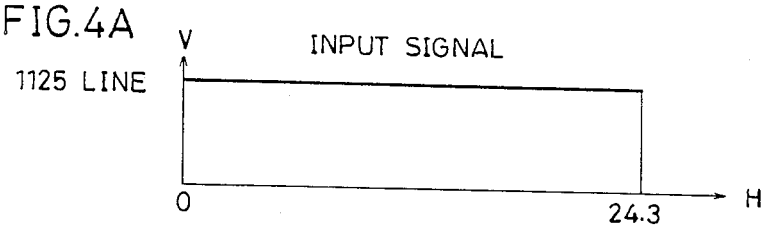
FIG.4A 1125 LINE — INPUT SIGNAL

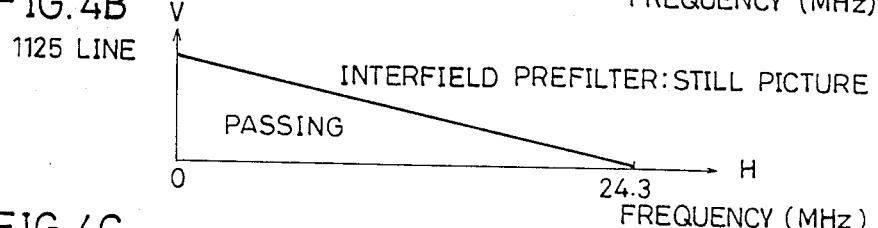
FIG.4B 1125 LINE — INTERFIELD PREFILTER: STILL PICTURE

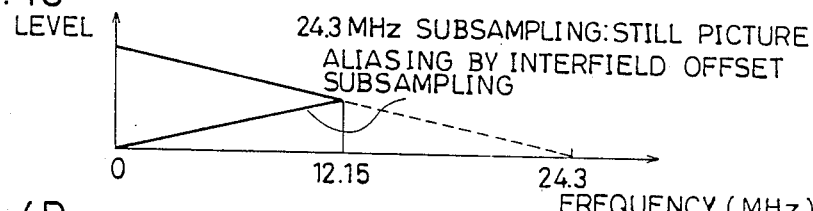
FIG.4C — 24.3 MHz SUBSAMPLING: STILL PICTURE ALIASING BY INTERFIELD OFFSET SUBSAMPLING

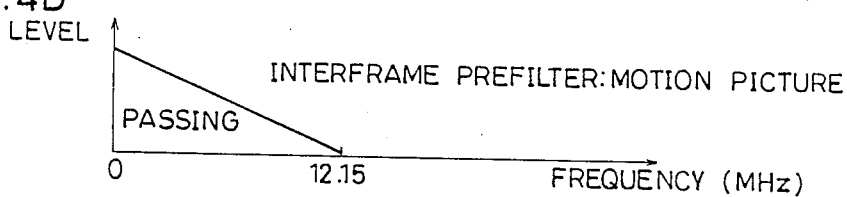
FIG.4D — INTERFRAME PREFILTER: MOTION PICTURE

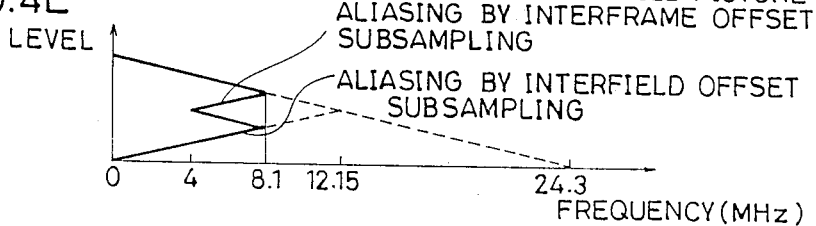
FIG.4E — 16.2 MHz SUBSAMPLING: STILL PICTURE ALIASING BY INTERFRAME OFFSET SUBSAMPLING / ALIASING BY INTERFIELD OFFSET SUBSAMPLING

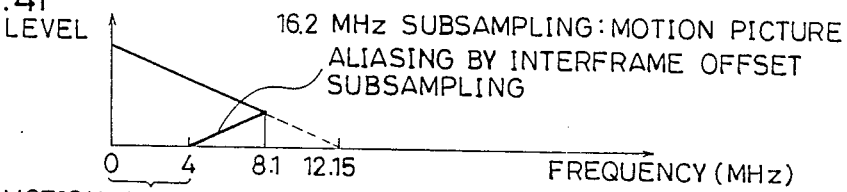
FIG.4F — 16.2 MHz SUBSAMPLING: MOTION PICTURE ALIASING BY INTERFRAME OFFSET SUBSAMPLING

MOTION CAN BE DETECTED BY AN INTERFRAME DIFFERENCE SIGNAL

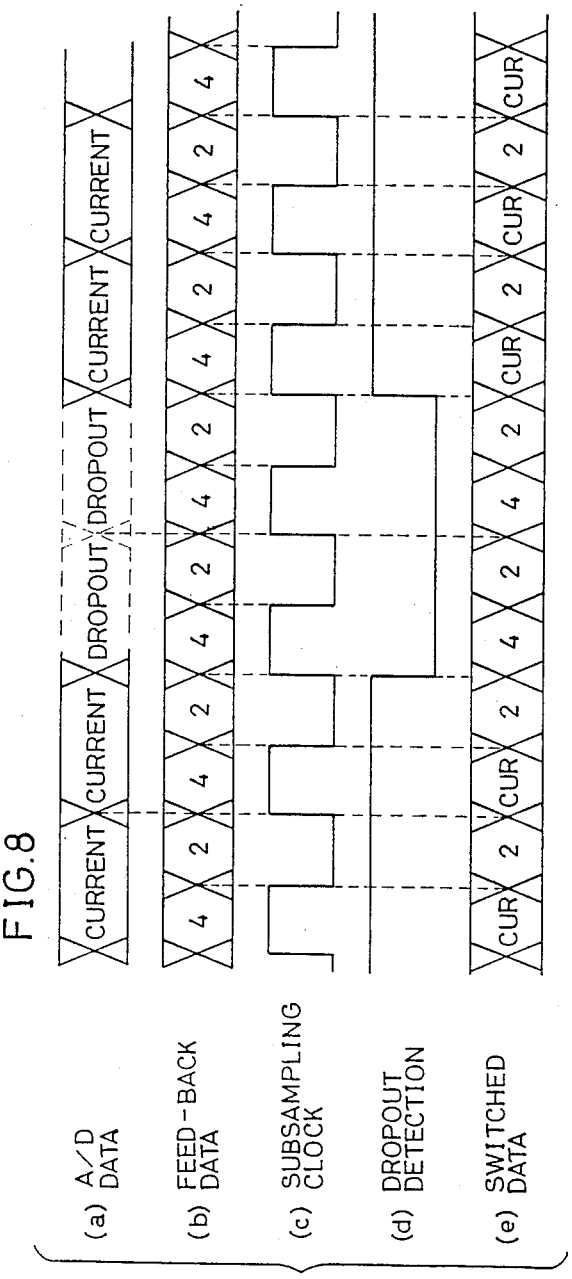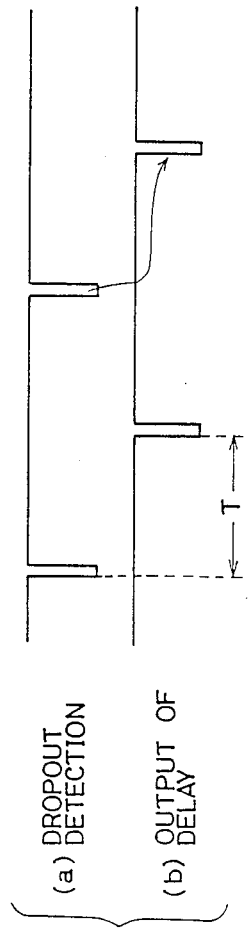

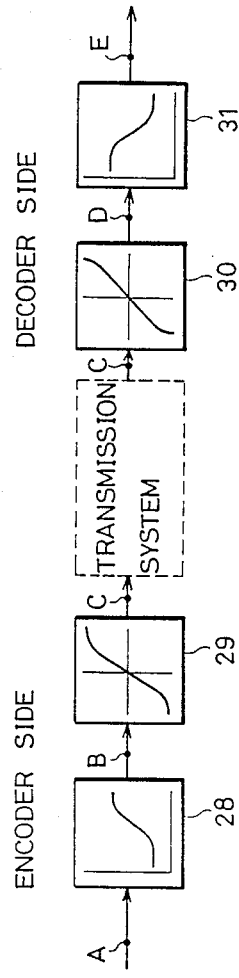
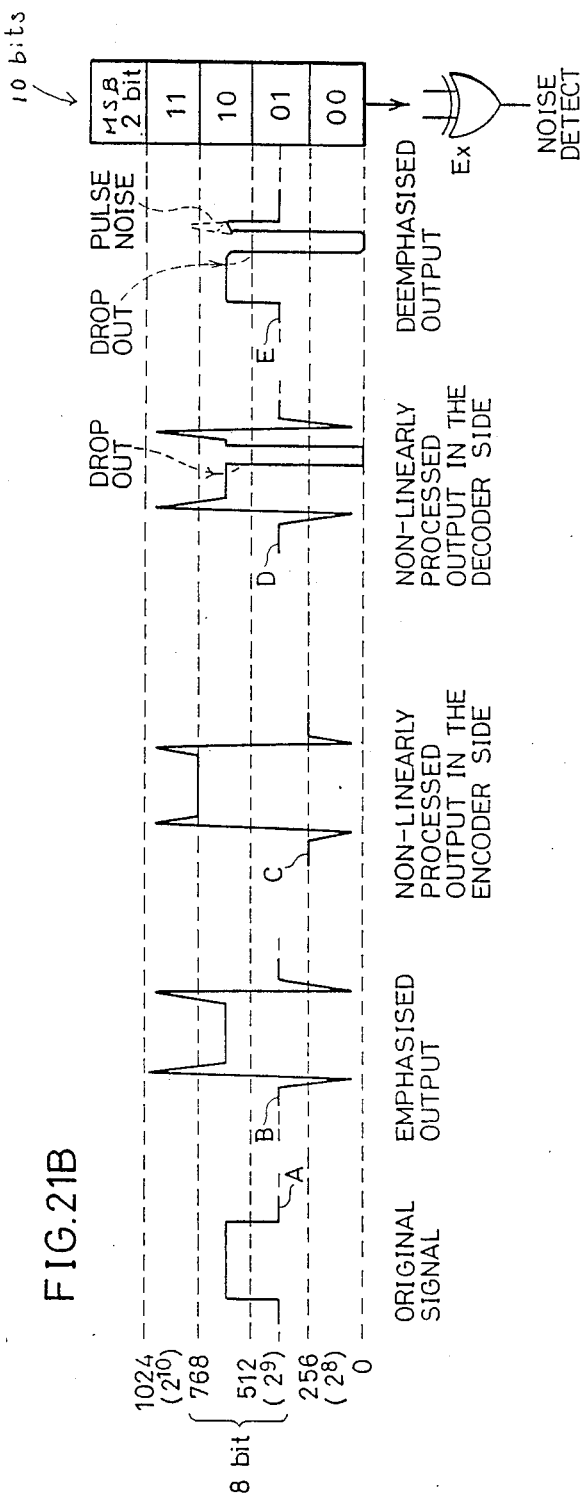

APPARATUS FOR DEMODULATING SUB-NYQUIST SAMPLED VIDEO SIGNAL AND DEMODULATING METHOD THEREFOR

BACKGROUND OF THE INVENTION

1. Field of the Invention

The present invention relates to an apparatus for demodulating a Sub-Nyquist sampled video signal and a demodulating method therefor, and more particularly, it relates to an apparatus for demodulating a Sub-Nyquist sampled video signal to include no aliasing noise component caused by Sub-Nyquist sampling in its low-frequency range and a demodulating method therefor. More specifically, the present invention relates to circuit structure and a method for compensating dropout in a received Sub-Nyquist sampled video signal.

2. Description of the Background Art

A band compressing technique called MUSE (Multiple Sub-Nyquist Sampling Encoding) is a system of transmitting a television signal of high picture quality. For example, NHK Research Laboratory Monthly Review, July 1984, pp. 275 -285 discloses a method of encoding and decoding a signal in such a MUSE system. The signal compressing technique in this MUSE system is now briefly described. In the MUSE system, an HDTV (high definition television) signal having 1215 scanning lines is transmitted through a single channel of 27 MHz in bandwidth. The baseband width is compressed to about 8 MHz in order to transmit an FM-modulated high definition signal in the single channel of 27 MHz in bandwidth. FIG. 1 shows the sampling pattern in such a MUSE system. As understood from FIG. 1, this sampling is multiple interlace type Sub-Nyquist sampling with a cycle of four fields. As shown in FIG. 1, signals are culled out to be sampled according to this sampling technique, with 180° sampling phase difference between lines and between fields. Thus, required bandwidth for transmission converted in spatial frequency is 1/(4d) (see FIG. 1). In the MUSE system, the required bandwidth for transmission is set at 8.1 MHz. That is, the transmission sampling rate is 16.2 MHz. According to this sampling pattern, successively transmitted signals are so sequentially stored in a receiving (reproducing) side that pictures can be reproduced by using all of the sampling points shown in FIG. 1 in the case of a still picture area. FIG. 2 shows a transmissible region of the spatial frequency domain for a still picture area (portion of the field where the picture is still). Referring to FIG. 2, the horizontal axis represents horizontal spatial frequency and the vertical axis represents vertical spatial frequency. As shown in FIG. 2, values of vertical and horizontal spatial frequencies are 1/(2h)=1125 TV lines and 1/(2d)=32.4 MHz in the case of the still picture area.

In the case of a motion picture area (portion of the field where the picture moves), multi-line blur is caused or the sampling pattern appears on the scene in the form of a net if past sampling points are used. Hence, the picture must be reproduced by using only the sampling points of the current field. As shown in FIG. 3, a transmissible region in this case is narrower than that in the still picture area, and hence blurring of the picture is noticeable in the case of motion caused by panning or tilting. To avoid such influence, spatial interpolation and motion compensation are performed. An encoder calculates a vector (motion vector) representing the motion of a scene for each field. A motion vector signal is multiplexed in a vertical blanking period of a video signal and transmitted to a receiver as a control signal. In response to the motion vector, a decoder provided in the receiver shifts and overlaps positions of past picture data (those of a preceding field, for example) to process the same as those of a still picture area. Since the picture data, which is processed as that of a motion picture area when no motion correction is performed, is processed as that of a still picture area, resolution of the picture can be improved. In the MUSE system, motion correction is performed only when the entire scene uniformly moves in the case of panning, for example. With such motion correction, temporal interpolation is applied to a panned or tilted scene. As shown in FIG. 3, the maximum vertical transmissible frequency for a motion picture area is half that for a still picture area. This is because the original high definition television (HDTV) signal is subjected to 2:1 interlace scanning. If spatial interpolation is applied to a still picture area of a scene, the maximum transmissible vertical spatial frequency is doubled to 1/(2h), where h represents an interval between adjacent horizontal scanning lines.

In the aforementioned sampling system, aliasing noise is caused around a sampling frequency through Sub-Nyquist sampling (hereinafter simply referred to as subsampling). When such aliasing noise is caused, noise conspicuously appears on the scene. Thus, it is desirable to remove such aliasing noise, particularly that extending toward a low frequency range.

In the aforementioned multiple subsampling transmission system, a subsampling cycle consists of two frames (four fields). Hence, one-interframe difference signal cannot be used for motion detection on a receiver side (decoder side) since there is no object to be detected but two interframe difference signal must be employed. Thus, motion detection is imperfect.

The term "interframe difference" indicates signal level difference between first and second frames in FIG. 1, for example, and the term "difference between next adjacent frames" indicates signal level difference between the first and third frames in FIG. 1, for example. The reason why this motion detection is imperfect is now described in more concrete terms. As to a still picture area, interpolation is performed by using a signal in a preceding frame. However, such interpolation cannot be applied to a motion picture area.

Thus, there has been proposed a multiple subsampling transmission system which performs motion detection by using a complete interframe difference signal for simplifying the structure of a receiver (decoder) and improving the picture quality. Such improving system is disclosed in U.S. Pat. No. 4,692,801 and in Nikkei Electronics, November 2, No. 433, pp. 189 to 212. The methods disclosed in these references are both a technique for generating no aliasing noise or reducing it basically. The method of this improved MUSE system is now briefly described, with reference to U.S. Pat. No. 4,692,801. According to this method, sampling is so performed as to cause no aliasing noise in a low-frequency component, and the low-frequency component having no aliasing noise is employed as a signal for detecting one-interframe difference signal.

This system is now briefly described with reference to the drawings. In the following description, the term "interframe/interline offset subsampling" indicates subsampling carried out by using clocks which are inversed every frame/line, in correspondence to sampling points in the 4n-th field and the (4n+2)-th field shown in FIG. 1, for example.

The term "interfield offset sampling" indicates subsampling carried out by using clocks which are inversed in phase every field, in correspondence to sampling points in the 4n-th field and the (4n+2)-th field, and those in the fourth field, the (4n+1)-th field and the (4n+3)-th field in FIG. 1, for example.

Further, the term "interframe in-phase" indicates the fact that, when a high-frequency component is aliased, the amplitude of a corresponding signal (8–12 MHz, for example) is in phase in succeeding frame. This definition also applies to "interfield in-phase".

The term "temporal interpolation" indicates interpolation processing performed through sampling values between picture signals having time difference such as interfield difference (time difference: 1/60 sec.) or interframe difference (time difference: 1/30 sec.). With reference to FIGS. 4A to 4F, brief description is made on encoding and decoding in the MUSE system including no aliasing noise in the low-frequency range.

(1) An input signal is sampled at a sampling frequency of 48.6 MHz. Thus, an output having bandwidth as shown in FIG. 4A is obtained Referring to FIG. 4A, the horizontal axis represents horizontal frequency component and the vertical axis represents signal level.

(2) Filtering processing is performed by an interfield prefilter (not shown) in order to process a still picture portion, whereby high frequency components in oblique directions are removed as shown in FIG. 4B.

(3) Interfield offset sampling is carried out at a sampling frequency of 24.3 MHz. Consequently, signals in a frequency range exceeding 12.15 MHz are aliased about the frequency of 12.15 MHz, as shown in FIG. 4C.

(4) The sampling frequency of 24.3 MHz shown in FIG. 4C is converted to that of 32.4 MHz by sampling frequency conversion processing. In this case, the signal bandwidth remains in that shown in FIG. 4C. In other words, only the sampling frequency is converted while the frequency bandwidth remains unchanged.

(5) Filtering processing is performed by a filter having a characteristic shown in FIG. 4D for processing a motion picture portion, thereby to limit the frequency bandwidth of the horizontal component to 12 MHz.

(6) The bandwidth-limited signal is further sampled at the sampling frequency of 24.3 MHz. In this case, no aliasing is caused since the sampling frequency is 24.3 MHz and the frequency bandwidth of the bandwidth-limited signal is limited to 12 MHz, and hence the signal bandwidth shown in FIG. 4D is maintained.

(7) The signal sampled at the sampling frequency of 24.3 MHz as shown in FIG. 4D is subjected to sampling frequency conversion, so that its sampling frequency is converted to 32.4 MHz. In this case, only the sampling frequency is converted and the signal bandwidth remains in that shown in FIG. 4D. Since no change is caused in the signal bandwidth at the steps (6) and (7), the sampling frequency is directly converted from the original frequency of 48 MHz to 32.4 MHz.

(8) A difference signal between adjacent frames is detected and the absolute value of the frame difference signal is obtained. This absolute value is converted to a nonlinear motion detection signal through a ROM, for example, and outputted as a signal indicating the amount of motion.

(9) In accordance with the amount of motion thus obtained, the still picture obtained at the step (4) and the motion picture obtained at the step (7) are mixed with each other at a ratio responsive to the amount of motion.

(10) The composite signal is subjected to interframe offset sampling at a sampling frequency of 16.2 MHz. Consequently, the still picture (FIG. 4C) and the motion picture (FIG. 4D) are aliased in a 8.1 MHz region, to have bandwidth values shown in FIGS. 4E and 4F respectively. As shown in FIG. 4D, the bandwidth of the motion picture area is limited to 12.15 MHz, and hence no aliased portion is present in a frequency range lower than 4 MHz

(11) Thereafter a digital-to-analog converted composite signal is transmitted.

On the decoder side, procedure reverse to the above is performed.

Demodulating operation on the decoder side is now described.

(1) First, an analog-to-digital converter performs re-sampling. Thus, the signal bandwidth of the still picture is brought into that shown in FIG. 4E, and the signal bandwidth of the motion picture area is brought into that shown in FIG. 4F.

(2) The still picture is subjected to interframe pixel insertion. That is, non-sampled pixels are replaced by those in a preceding frame. Consequently, the signal spectrum shown in FIG. 4C is reproduced from an aliased portion shown in FIG. 4E. The term "interframe interpolation" indicates procedure for obtaining an interpolation signal by using sampled values obtained from succeeding frames.

(3) The signal shown in FIG. 4C is subjected to sampling frequency conversion. Thus, the sampling frequency is converted from 32.4 MHz to 24.3 MHz while the signal bandwidth remains unchanged.

(4) Interfield interpolation processing is performed on the signal subjected to sampling frequency conversion, whereby a signal having the signal bandwidth shown in FIG. 4B is reproduced from the aliased portion shown in FIG. 4C.

(5) The motion picture area is subjected to interfield interpolation processing. Thus, the aliased portion shown in FIG. 4D is reproduced from a frequency spectrum shown in FIG. 4F.

The term "interfield interpolation" indicates procedure for obtaining an interpolation signal by using sampled values in the same field.

(6) Sampling frequency conversion is performed on the motion picture area, whereby the sampling frequency is converted from 32.4 MHz to 48.6 MHz. In this case, the signal bandwidth remains in that shown in FIG. 4D.

(7) Bandwidth limitation is performed on the motion picture area, so that its signal bandwidth is limited to 4 MHz. An interframe difference signal is obtained by the bandwidth-limited signal. This interframe difference signal is then subjected to nonlinear processing, to provide an amount of motion.

(8) In accordance with the detected amount of motion, the still picture area and the motion picture area are linearly mixed with each other.

(9) Digital-to-analog conversion processing is performed. In this case, the still picture has the signal bandwidth shown in FIG. 4B while the motion picture area has the signal bandwidth shown in FIG. 4D.

As hereinabove described, a difference signal between adjacent frames (one interframe difference signal) is derived by using a signal including no aliased signal component in its low-frequency range, and this difference signal is obtained as a signal for detecting motion (step 7). Correct motion detection is effected by such one interframe difference signal including no aliasing noise.

In the aforementioned structure, a frame memory is required for the decoder, in order to derive the difference signal between adjacent frames. Thus, it is possible to perform noise reduction through the frame memory, to reduce required C/N (carrier/noise) in a transmission path. However, the quality of a still picture is generally degraded upon noise reduction, and hence such noise reduction is avoided with respect to a motion picture area. In such structure, however, a motion picture may be judged as a still picture particularly in a flat portion of the picture due to incomplete judgement of motion/stillness, to cause a delay in the motion of this portion. Thus, motion of the entire scene may be ununiformalized upon movement of a camera, for example.

A similar phenomenon may be caused in signal decoding by the multiple subsampling system itself, which includes no interframe aliased component in the low frequency range. This is because, in such signal decoding, temporal interpolation is employed for a still picture area and spatial (intrafield) interpolation is employed for a motion picture area, and hence a delay is caused in motion of a flat portion due to an error in judgement of motion/stillness.

In order to solve the aforementioned problem, a low-frequency range (lower than 4 MHz) including no interframe aliased component is utilized to remove incompleteness in motion correction in the aforementioned detection of the motion picture area and to improve vertical resolution. That is, a low-frequency component of composite data is replaced by that of a given MUSE signal in signal demodulation. In this case, the low-frequency component is not subjected to interframe interpolation, interfield interpolation and intrafield interpolation operation, and hence a signal subjected to no filtering processing in the vertical direction is used as a transmission component, whereby it can be expected to obtain superior quality with respect to vertical resolution.

In a decoder of the aforementioned method of replacing the low-frequency range, however, the following problem is caused: In the case of reproducing a video signal from a recording medium for a high definition video signal such as a video disk, dropout may be caused in a reproduced MUSE signal by a flaw in the disk or the like. In this case, MUSE signal input is blocked upon generation of dropout detection output, and the dropout portion is replaced by a reproduced MUSE signal preceding by two frames, thereby to compensate the dropout portion in the conventional system, as described in Japanese Patent Laying-Open Gazette No. 56584/1986, for example.

If the conventional structure is applied to the high definition video signal decoder of the low-frequency replacement system to perform the aforementioned replacement of the low-frequency components when dropout is caused in a reproduced MUSE signal, a low-frequency component of high definition video data, which must be dropout-compensated by pixel data preceding by four fields and derived, is replaced by reproduced data including the dropout. Consequently, no dropout compensation is performed and a noise component with the dropout appears on the monitor screen.

SUMMARY OF THE INVENTION

An object of the present invention is to provide an improved high definition video signal reproducer.

Another object of the present invention is to provide a high definition video signal reproducer which is excellent in vertical resolution.

Still another object of the present invention is to provide a reproducer which can reproduce a high definition video signal of high quality including no noise component such as dropout.

A further object of the present invention is to provide a method of reproducing a high definition video signal of high quality.

A high definition video signal reproducer according to the present invention comprises a circuit (LC) for performing low-frequency replacement of composite data obtained by mixing still picture data and motion picture data by first data corresponding to the current field and a circuit for inhibiting operation for replacing a low-frequency component of the composite data by that of the first data upon generation of noise such as dropout. More specifically, the present invention comprises a digital converter for deriving digital data of the current field from a reproduced MUSE signal, a switching circuit for receiving feedback data, in which data preceding by two fields and data preceding by four fields with respect to the current field are alternately arranged, and digital data of the current field and replacing the data preceding by four fields by first data corresponding to the digital data of the current field for outputting the same, a memory for storing output of the switching circuit and outputting the feedback data, an intrafield interpolation circuit for intrafield-interpolating the output from the switching circuit for forming motion picture data, an interfield interpolation circuit for interfield-interpolating the output from the switching circuit for forming still picture data, a mixing circuit for mixing the motion picture data and the still picture data for deriving composite data, a circuit for replacing the composite data by a low-frequency component of the current field digital data (or the first data) and a circuit for inhibiting the low-frequency replacement operation of the first data (or the current field data) and the composite data upon generation of noise such as dropout.

The low-frequency replacement inhibiting circuit comprises a circuit for alternately outputting the data preceding by four fields as the first data and the data preceding by two fields upon generation of noise by inhibiting replacement of the data preceding by four fields and the first data upon generation of noise and a circuit for inhibiting low-frequency replacement in the low-frequency replacement circuit in response to a noise detection signal.

According to another aspect of the present invention, a replacement inhibiting circuit comprises a circuit for inhibiting replacement of data preceding by four fields and first data in response to a noise generation detection signal upon generation of noise and controlling a switching circuit to derive the data preceding by four fields as the first data and a circuit for extracting a data train corresponding to data of the current field from a data train from this switching circuit and supplying the same to a low-frequency replacement circuit.

Still another low-frequency replacement inhibiting circuit comprises a circuit for supplying first data corresponding to digital data of the current field to a low-frequency replacement circuit and inhibiting replacement of digital data preceding by four fields and the first data upon detection of noise thereby to control a switching circuit to output a data train in which the data preceding by four fields and data preceding by two fields are alternately arranged and a circuit for inhibiting low-frequency replacement in a low-frequency replacement circuit in response to a noise detection signal from a noise detection circuit. In this circuit structure, noise detection is performed by monitoring the signal level of the current field digital data.

A high definition video signal reproducing method according to the present invention comprises a step of mixing/composing a still picture and a motion picture, a step of replacing a low-frequency component of composite data by first digital data corresponding to data of the current field and a step of inhibiting such low-frequency replacement upon generation of noise.

According to the above structure, composite data formed by motion picture data and still picture data both subjected to dropout/or noise compensation is derived as high definition video data upon generation of noise such as dropout, whereby high definition video data of high quality, including no noise component, can be obtained.

Further, low-frequency replacement of the composite data is performed through the data corresponding to the current field, in which noise such as dropout is compensated, so that no noise component is included in a reproduced high definition video signal and high definition video data of high quality can be obtained These and other objects, features, aspects and advantages of the present invention will become more apparent from the following detailed description of the present invention when taken in conjunction with the accompanying drawings.

BRIEF DESCRIPTION OF THE DRAWINGS

FIGS. 4A to 4F illustrate operation of signal encoding and that of signal decoding in a MUSE system;

FIG. 8 illustrates the operation of the MUSE decoder shown in FIG. 7;

FIG. 9 illustrates the operation of a delay circuit, which is replacement inhibiting signal generating means shown in FIG. 7;

FIGS. 21A and 21B illustrate signal processing paths in a conventional MUSE system, for illustrating the technique of noise detection in the seventh embodiment;

DESCRIPTION OF THE PREFERRED EMBODIMENTS

Figure 1:
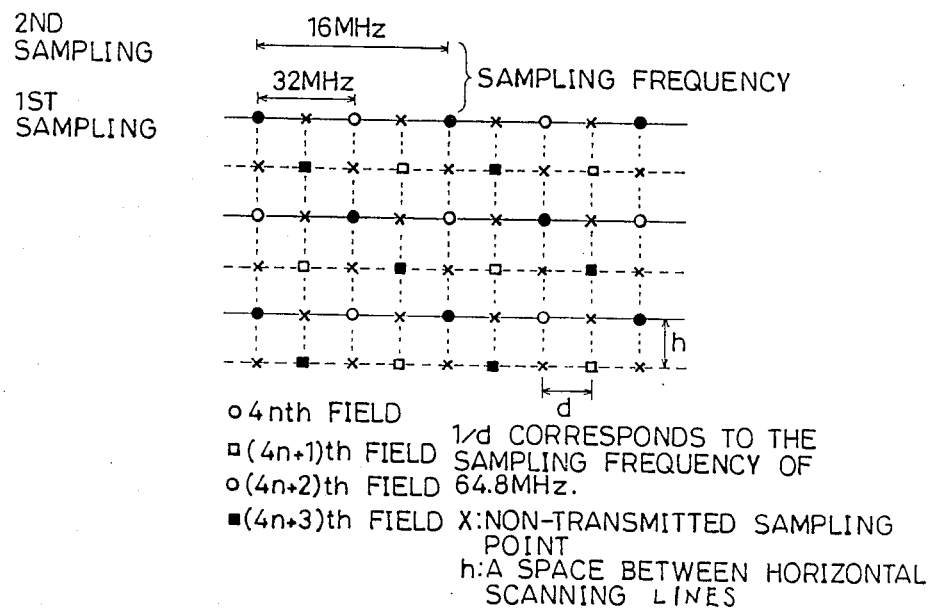
FIG. 1 illustrates the sampling pattern of a MUSE signal.
Figure 2:
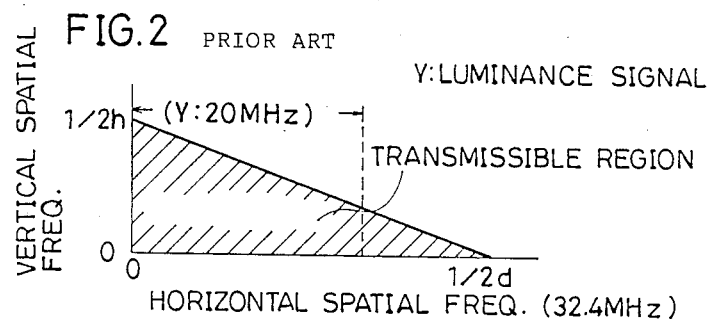
FIG. 2 illustrates a transmissible spatial frequency region in interpolation using four fields in a MUSE signal.
Figure 3:
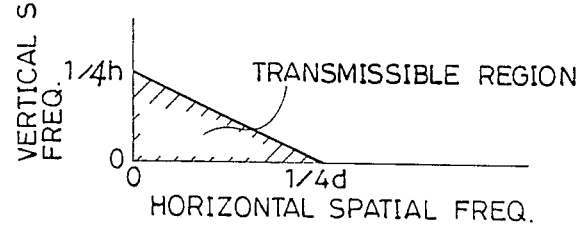
FIG. 3 illustrates a transmissible spatial frequency region in interpolation using one field in the MUSE signal.
Figure 5:
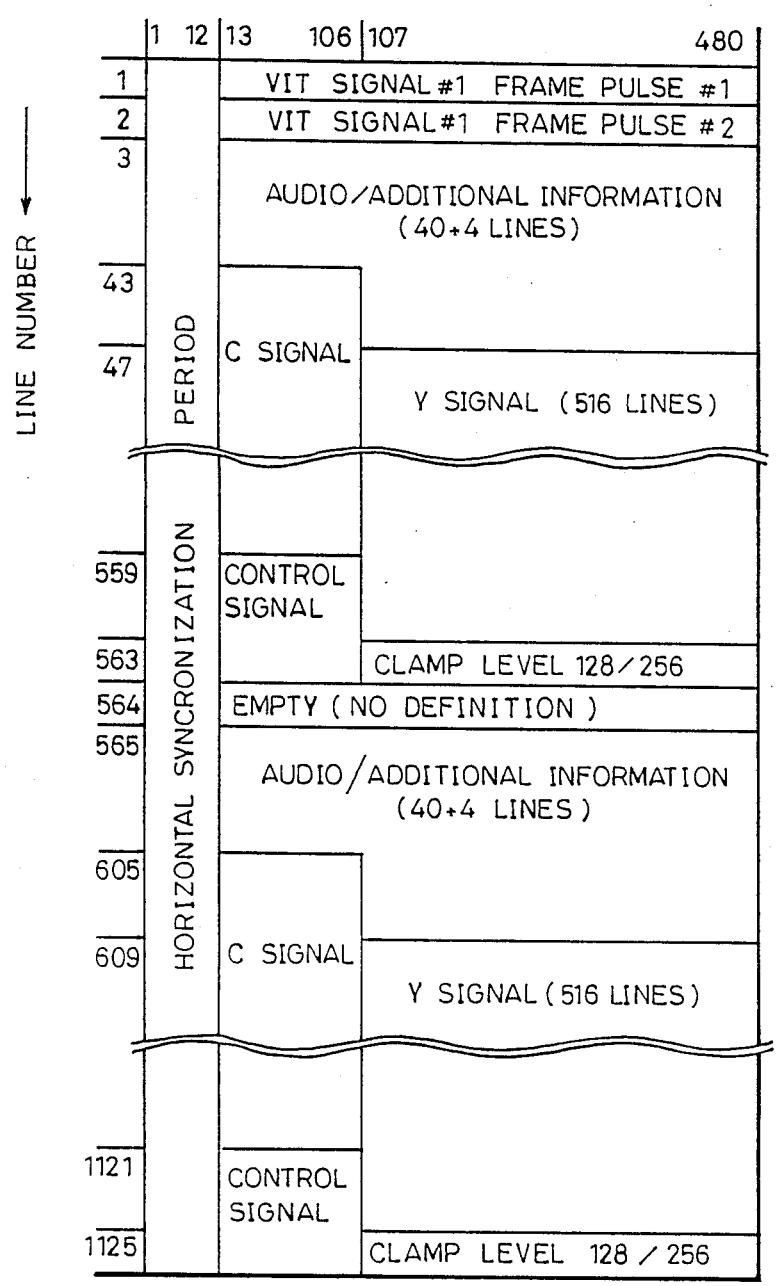
FIG. 5 illustrates the structure of signals in one frame of a MUSE signal.

Before explaining embodiments of the present invention, the structure of a MUSE signal is briefly described. FIG. 5 shows the structure of signals in one frame of the MUSE signal. Referring to FIG. 5 sampling numbers in the case of a sampling frequency of 16.2 MHz are shown in the horizontal direction and line numbers of horizontal scanning lines are shown in the vertical direction. VIT (vertical interval test) signals, which are reference signals for equalizing transmission paths in order to satisfy distortionless conditions for transmission of sampled values, and frame pulses for vertical synchronization are inserted in first two lines. One frame is formed by 1125 horizontal scanning lines, and a sampling number for one line is 480. A horizontal synchronizing signal HD is inserted in an area having sampling numbers 1 to 12. A ternary audio signal is multiplexed with a baseband signal wit required additional information. Chrominance (C) signals are so subjected to inverse gamma (γ) correction that color difference signals R-Y and B-Y are derived from red (R), green (G) and blue (B) signals. These color difference signals are line-sequentialized. The line-sequential C signals are subjected to ¼ time-base compression, and multiplexed in a blanking period of a luminance signal (Y signal). The contents of processing performed on the C signals and the Y signal are substantially those described above, and identical to each other. Difference of four lines is provided between the C signals and the Y signal, since difference is caused between signal processing times therefor. A line 564 is reserved for future use. A clamp level provides a level for clamping a white level of a signal etc.

A control signal is inserted in a vertical blanking period for four lines. This control signal includes various control data such as a horizontal motion vector, a vertical motion vector, a Y signal subsampling phase, a C signal subsampling phase, noise reducer control and the like. As shown in FIG. 5, a transmission signal or a reproduction signal in the MUSE system is a TCI (time compressed integration) signal which is obtained by line-sequentializing the C signals and time-base integrating the same.

Figure 6A:
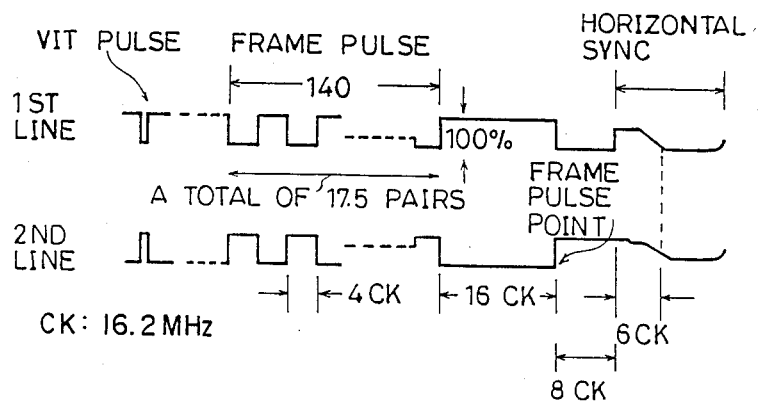
FIGS. 6A and 6B illustrate frame pulse waveforms and horizontal synchronizing signal waveforms in a MUSE signal respectively.
Figure 6B:
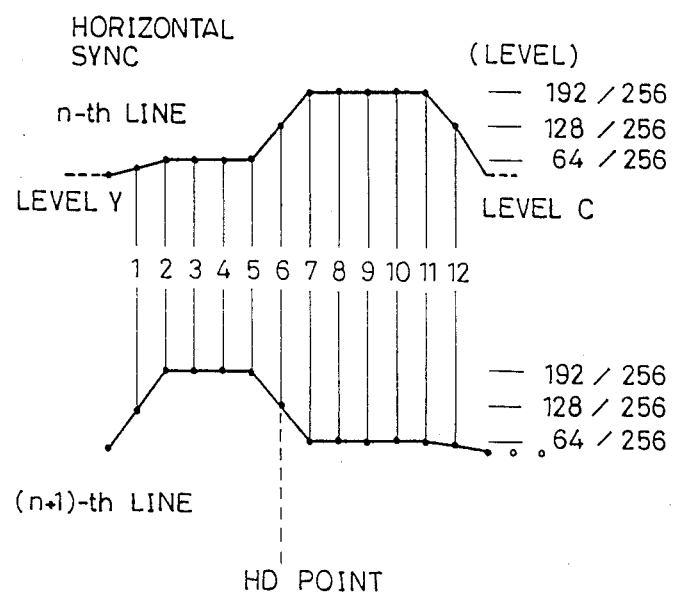

FIGS. 6A and 6B are enlarged views showing a horizontal synchronizing period part. Referring to FIG. 6A, a VIT signal is multiplexed with a frame pulse for providing vertical synchronization. A frame pulse and a VIT pulse are in the ratio of 8:1 in pulse width. The VIT signal is a single pulse of 32.4 MHz. The first line of this VIT signal is a positive polarity pulse and the second line is a straight polarity pulse. The pulse signal source is not restricted to a high definition video disk player, but may be formed by a MUSE receiver, a MUSE-VTR (video tape recorder) or a MUSE-VTR contained in such a MUSE decoder MD. The MUSE signal source must be able to detect dropout in a reproduced MUSE signal as well as to output a dropout detection signal. A high definition video disk employed as a recording medium in the high definition video disk player VD records an FM-modulated MUSE signal. A reproduced FM-MUSE signal reproduced from the high definition video disk is supplied to an FM demodulator 1 and a dropout detector 2. The FM demodulator 1 demodulates the FM-modulated MUSE signal, to derive a reproduced MUSE signal. The dropout detector 2 includes an envelope detecting circuit, and outputs a dropout detection signal on the assumption that the reproduced FM-MUSE signal has dropout due to some cause when the level after envelope detection is below a prescribed level. In other words, the dropout detector 2 detects attenuation in amplitude of the reproduced FM-MUSE signal or dropout of a carrier component, and derives the dropout detection signal on the basis of the result of detection. The reproduced MUSE signal from the video disk player VD is supplied to an analog-to-digital converter (A-D converter) 3 provided in an input part of the MUSE decoder. The A-D converter 3 converts a supplied analog position is changed by one clock of 32.4 MHz every frame. That is, the pulse position is alternately changed such that, when the pulse (VIT signal pulse) is present in a left-hand side in the first line of a certain frame, the pulse is present in a right-hand side in the first line of a next frame and in the left-hand side in the first line in a next succeeding frame. Characteristics of a transmission path through which the MUSE signal is passed can be measured by detecting the VIT signal of the signal pulse. The frame pulse occupies a period of 140 CK (CK: 16.2 MHz), and 17.5 pulse signals are inserted. The frame pulse is also inverted in polarity between first and second lines. FIG. 6B is an enlarged view showing the horizontal synchronizing signal HD. The horizontal synchronizing signal has a waveform with inversion for each line. The horizontal synchronizing signal is reset upon complete transmission of the frame pulse. An HD point is adapted to detect the sampling phase in case of re-sampling.

Figure 7:
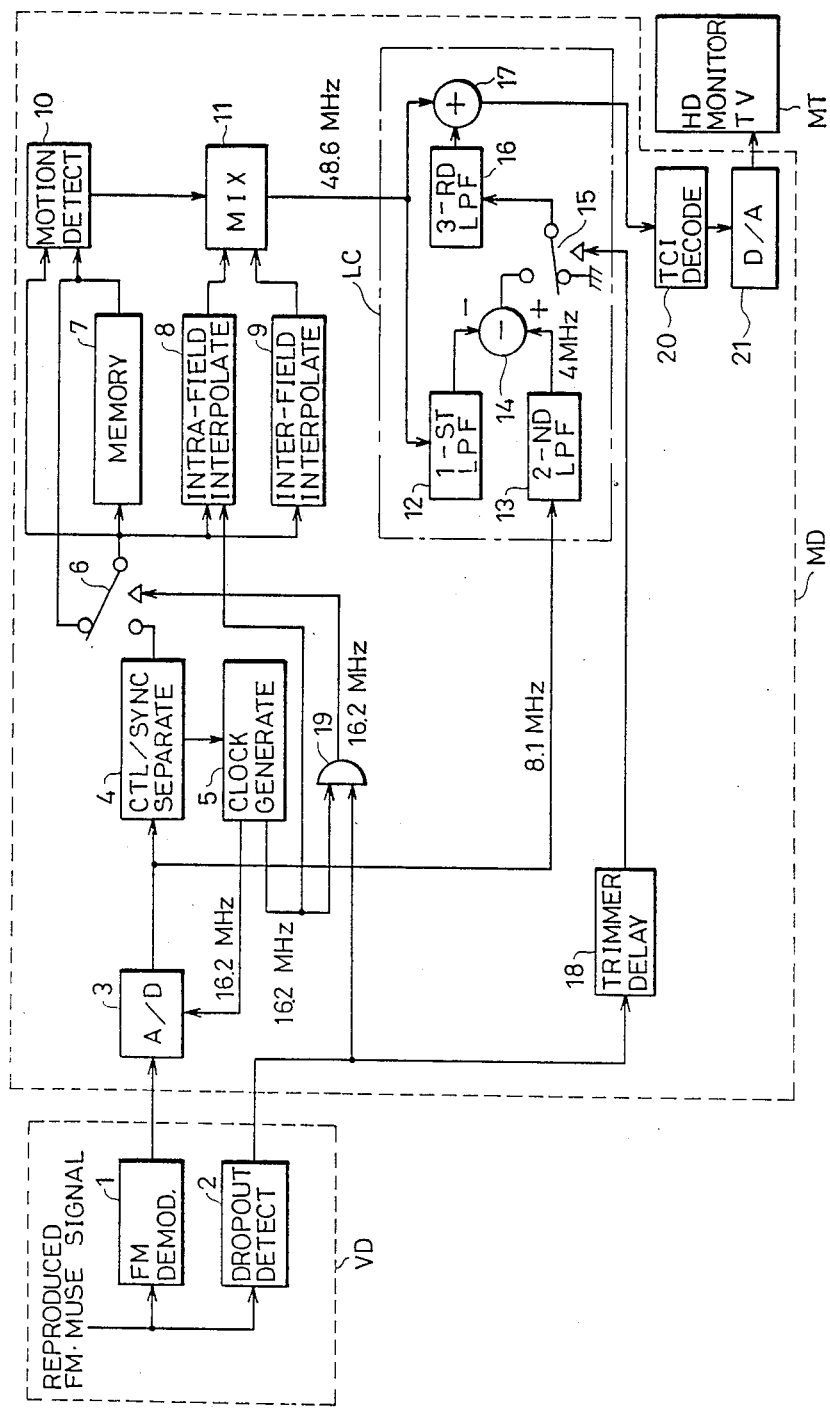
FIG. 7 illustrates the structure of a MUSE decoder according to a first embodiment of the present invention.

With reference to FIG. 7, description is now made on exemplary structure of the present invention, which is applied to a high definition video reproducing system for decoding a MUSE signal obtained from a high definition video disk player VD by a MUSE decoder MD and monitoring the same by a high definition monitor TV-MT. The MUSE signal to a digital signal in response to a clock pulse of 16.2 MHz supplied from a clock pulse generator 5. The A-D converted data form the A-D converter 3 is supplied to a control/sync separation circuit 4. The control/sync separation circuit 4 separates signal components such as luminance, chrominance and audio signals, a control signal component and a synchronizing signal component from the digital data received from the A-D converter 3. The synchronizing signal component separated in the control/sync separation circuit 4 is supplied to the clock pulse generator 5, and the separated signal components are supplied to a first input of an input switching circuit 6. The clock pulse generator 5 derives various signals having desired sampling frequencies on the basis of an HD point of a horizontal synchronizing signal included in the digital data as a reference signal.

Feedback data outputted from a memory 7 is inputted in a second input of the input switching circuit 6. The memory 7 stores data for two frames. The feedback data from the memory 7 is in the form of a data train in which data preceding by two fields and digital data preceding by four fields are alternately arranged with respect to the signal components supplied to the first input of the input switching circuit 6, as shown at FIG. 8(b). Signal data of the current field and the feedback data from the memory 7, which is supplied to the two inputs of the input switching circuit 6, are alternately selected in response to a clock signal of 16.2 MHz from an AND gate 19. The AND gate 19 receives the clock pulse from the clock pulse generator 5 and the dropout detection signal from the video disk player VD. The dropout detection output is at a high level when no dropout is caused. Thus, unless dropout is caused in the reproduced MUSE signal, the signals of the current field and the feedback data from the memory 7 are alternately selected by a subsampling clock of 16.2 MHz obtained from the clock pulse generator 5. That is, the input switching circuit 6 and the memory 7 form an interframe interpolation circuit. Consequently, digital data obtained from the input switching circuit 6 is in the form of a data train in which A-D converted data of the current field and A-D converted data preceding by two fields are alternately arranged. The data train results from interframe temporal interpolation. The A-D converted data preceding by two fields and that preceding by four fields can be easily alternately outputted from the memory 7 by simply causing a two-field delay in the memory 7 and thereafter reading out the data in synchronization with a switching frequency in the input switching circuit 6. This is because the output from the input switching circuit 6 is also supplied to the memory 7 and the output data train from the input switching circuit 6 is formed by a train of the data of the current field and the data preceding by two fields.

The switched data from the input switching circuit 6 is stored in the memory 7, and supplied to an intrafield interpolation circuit 8 and an interfield interpolation circuit 9.

The intrafield interpolation circuit 8 performs spatial interpolation using only the A-D converted data of the current field (upon occurrence of dropout, A-D converted data preceding by four fields) out of the switched data received from the input switching circuit 6, to form motion picture data.

The interfield interpolation circuit 9 performs interfield interpolation on the A-D converted data of the current field and the A-D converted data preceding by two fields received from the input switching circuit 6, thereby to form still picture data.

The motion picture data and the still picture data formed in the intrafield interpolation circuit 8 and the interfield interpolation circuit 9 are supplied to a mixing circuit 11. The mixing circuit 11 linearly changes a mixing ratio in response to motion detection output from a motion detecting circuit 10, and generates composite output.

The motion detecting circuit 10 detects the motion of the picture using the switched data from the input switching circuit 6 and the feedback data from the memory 7, to generate a signal responsive to the amount of motion of the picture as the motion detection output. The mixing circuit 11 forms the composite data by increasing the rate of the still picture data in a portion with small motion and increasing the rate of the motion picture data in a portion with large motion, and outputs the same.

The composite data thus obtained is replaced by a low-frequency component of a digital reproduced MUSE signal from the A-D converter 3, which has no aliasing noise in its low-frequency range, in order to improve vertical resolution etc. A low-frequency replacement circuit LC is adapted to replace a low-frequency component of the composite data from the mixing circuit 11 by that of the reproduced MUSE signal. The low-frequency replacement circuit LC has a first digital low-pass filter 12 for receiving the composite data from the mixing circuit 11 and a second digital low-pass filter 13 for receiving the A-D converted data from the A-D converter 3. The first digital low-pass filter 12 passes a predetermined low-frequency component within the composite data from the mixing circuit 11, and supplies the same to a negative input of a subtracter 14. The second digital low-pass filter 13 passes a prescribed low-frequency component of the A-D converted data from the A-D converter 3, and supplies the same to a positive input of the subtracter 14. The subtracter 14 subtracts the low-frequency component from the first digital low-pass filter 12 from a signal of the low-frequency component from the second digital low-pass filter 13, and outputs the result of subtraction. The sampling frequency of the composite data supplied to the first digital low-pass filter 12 is different from that of the A-D converted data supplied to the second digital low-pass filter 13. Therefore, a delay circuit (not clearly shown) is provided in a front or rear stage of the second digital low-pass filter 13, in order to put the sampling frequencies in phase and to compensate a time delay caused before the A-D converted data from the A-D converter 3 is outputted as the composite data from the mixing circuit 11.

The subtraction data from the subtracter 14 is subjected to removal of a high-frequency component in a third digital low-pass filter 16, and thereafter supplied to a first input of an adder 17. The adder 17 is supplied with the composite data from the mixing circuit 11 in its second input. The adder 17 adds up the composite data from the mixing circuit 11 and a low-frequency signal from the third digital low-pass filter 16 and outputs the result of addition. High definition video data obtained from the adder 17 is video data obtained by replacing the low-frequency component of the composite data by that of the A-D converted data from the A-D converter 3, which provides improved vertical resolution as hereinabove described.

The video data from the adder 17 is supplied to a TCI decoder 20. The TCI decoder 20 separates, time-base expands and makes simultaneous in time-base the line-sequentialized and time-compressed chrominance signals (C signals). The TCI decoder 20 outputs a Y signal, an R-Y signal and a B-Y signal. The data from the TCI decoder 20 is supplied to a D-A (digital-to-analog) converter 21 and converted to analog signals. The analog signals from the D-A converter 21 are supplied to a high definition monitor television receiver MT. The high definition monitor television receiver MT converts the analog signals thus received to R, G and B signals through an inverse matrix circuit and performs gamma correction to output the same, thereby to display the picture in response to the chrominance signals and the luminance signal.

When dropout is caused in a reproduced MUSE signal, the low-frequency component of composite data is replaced by that of the reproduced MUSE signal with the dropout in the aforementioned structure, and hence a dropout signal appears on the high definition monitor television receiver MT as noise. According to the present invention, therefore, a switching/replacement limiting circuit 15 is provided in order to inhibit replacement by the low-frequency component of the A-D converted data from the A-D converter 3 upon occurrence of such dropout.

Further, the AND gate 19 for receiving the clock pulse of 16.2 MHz from the clock pulse generator 5 and the dropout detection signal from the dropout detector 2 is so provided that the converted data having the dropout is not employed for intrafield interpolation, interframe interpolation and interfield interpolation through the input switching circuit 6 upon occurrence of the dropout. The output from the AND gate 19 controls switching operation of the input switching circuit 6. FIG. 8 is a signal waveform diagram showing control operation of the input switching circuit 6 by the AND gate 19. Referring to FIG. 8, a subsampling clock of 16.2 MHz shown at (c) is a clock pulse supplied from the clock pulse generator 5 to the AND gate 19. The operation of the input switching circuit 6 upon occurrence of dropout is first described with reference to FIG. 8. As hereinabove described, the feedback data from the memory 7 is data in which the data preceding by four fields and that preceding by two fields are alternately arranged with respect to the current field (FIG. 8(b)). The dropout detector 2 outputs a high-level signal when the same detects no dropout in a reproduced FM-MUSE signal. At this time, the AND gate 19 outputs the subsampling clock shown at FIG. 8(c), which serves as a control clock signal for the input switching circuit 6. As shown at FIG. 8(e), therefore, the data of the current field and the data preceding by four fields are switched in response to leading edges of the subsampling clock of 16.2 MHz in the input switching circuit 6, which in turn alternately outputs the data of the current field and that preceding by two fields which are sampled at 32.4 MHz.

Upon occurrence of dropout, the dropout detection output from the dropout detector 2 goes low. Since the output from the AND gate 19 goes low in this case, the input switching circuit 6 passes the feedback data from the memory 7. Hence, the input switching circuit 6 replaces a dropout portion by the data preceding by four fields. In other words, dropped-out A-D converted data of the current field is replaced by the A-D converted data preceding by four fields in the dropout occurrence period, whereby the dropped-out A-D converted data is compensated.

Operation for inhibiting low-frequency replacement upon occurrence of dropout is now described. The replacement limiting circuit 15 is provided between the subtracter 14 and the third digital low-pass filter 16. The replacement limiting circuit 15 has a first input for receiving the output from the subtracter 14, a second input connected to a ground potential level, and an output supplied to the third digital low-pass filter 16. Switching operation control of the replacement limiting circuit 15 is performed by output from a trimmer delay circuit 18, which delays the dropout detection output from the dropout detector 2 by a prescribed time T and outputs the same. The trimmer delay circuit 18 is adapted to compensate a processing time T (period for two or three lines) required during processing of the A-D converted data from the A-D converter 3 to be an output of the composite data from the mixing circuit 11.

Upon occurrence of dropout, the dropout detection output is supplied from the trimmer delay circuit 18 to the replacement limiting circuit 15 with the prescribed delay time of T, as shown in FIG. 9. In response to the delayed dropout detection output from the trimmer delay circuit 18, the replacement limiting circuit 15 switches its input contact to the ground potential level, and supplies output of "0" to the third digital low-pass filter 16. Thus, the adder 17 adds up the data from the third digital low-pass filter 16 and the composite data from the mixing circuit 11, and hence the video data is outputted with no low-frequency replacement. Upon occurrence of the dropout, therefore, the adder 17 outputs compensated data, which is simply replaced by the data preceding by four fields.

The aforementioned MUSE decoder MD has delay circuits for matching data timing (sampling phase) in respective parts in a front stage of any circuit block at need. However, such delay circuits are omitted for simplifying the illustration.

According to the above structure, the replacement limiting circuit 15 inhibits replacement of the low-frequency component of the dropped-out A-D converted data upon occurrence of the dropout, whereby the low-frequency component of the dropped-out A-D converted data is not included in the high definition video data so that a dropout-compensated high definition video signal can be obtained.

In the aforementioned embodiment, low-frequency replacement is inhibited with respect to a portion causing dropout. However, even if low-frequency replacement is inhibited for a period longer than the dropout occurrence period, no deterioration is caused in the picture quality since the low-frequency component itself has no aliasing noise.

Figure 10:
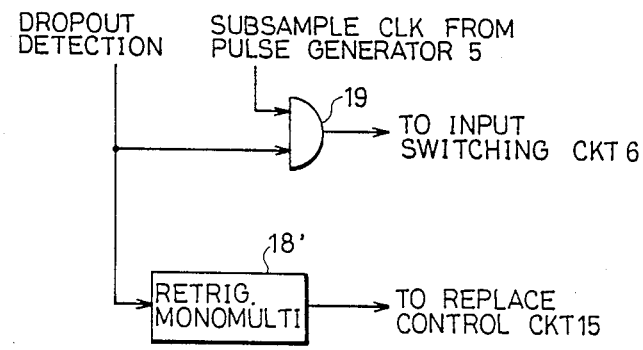
FIG. 10 illustrates the structure of a low-frequency replacement inhibiting signal generating circuit according to a second embodiment of the present invention.
Figure 11:
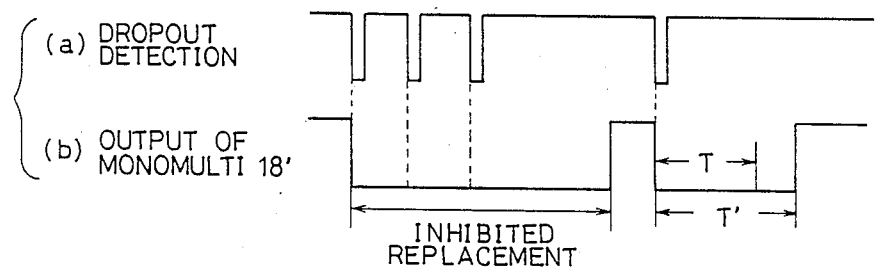
FIG. 11 is a signal waveform diagram showing the operation of the circuit shown in FIG. 10.

FIG. 10 shows exemplary structure for inhibiting low-frequency replacement for a period longer than a dropout occurrence period. Referring to FIG. 10, a retriggerable monomulti 18′ for receiving dropout detection output as a trigger signal is provided in place of the trimmer delay circuit 18 shown in FIG. 7. A metastable period of the retriggerable monomulti 18′ is set to be longer than the delay time T of the trimmer delay circuit 18. With reference to an operation waveform diagram shown in FIG. 11, the operation of the circuit shown in FIG. 10 is now described. A dropout detection output signal is supplied to the retriggerable monomulti 18′, which in turn derives a wide pulse having pulse width of T′. Output from the retriggerable monomulti 18′ is supplied to the replacement limiting circuit 15. Output pulse width of the retriggerable monomulti 18′ is longer than the delay time T of the aforementioned trimmer delay circuit 18. In response to the output pulse from the retriggerable monomulti 18′, the replacement limiting circuit 15 switches its input contact and supplies a signal of "0" to the third digital low-pass filter 16. The replacement limiting circuit 15 outputs "0" for a period between generation of the dropout detection signal and T′ (T′>T), and low-frequency replacement is inhibited also with respect to the data without dropout, from the subtracter 14. However, the output pulse width T′ of the monomulti 18, necessarily includes timing for low-frequency replacement of the dropout portion, as shown in FIG. 11. Thus, low-frequency replacement is inhibited for a long period including the dropout portion by switching the contact of the replacement limiting circuit 15 by the output signal from the monomulti 18′ and outputting the signal of "0" from the replacement limiting circuit 15. In the case of employing such a monomulti, its delay time may not necessarily be set at timing corresponding to the dropout portion in the output from the subtracter 14 dissimilarly to the trimmer delay circuit 18 and its delay time may not be set in consideration of delay times by respective circuits, whereby low-frequency replacement of the data including the dropout portion can be easily inhibited.

Figure 12:
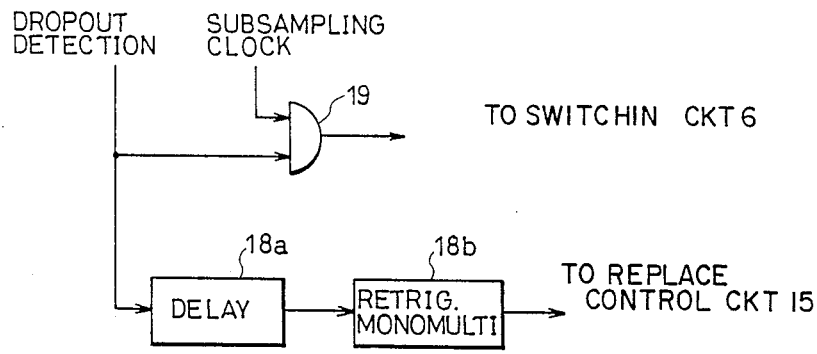
FIG. 12 illustrates the structure of a low-frequency replacement inhibiting signal generating circuit according to a third embodiment of the present invention.
Figure 13:
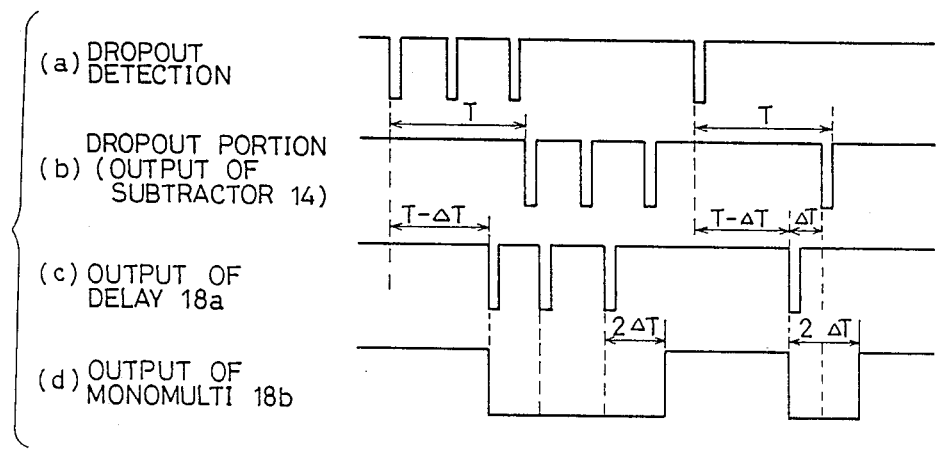
FIG. 13 is a signal waveform diagram showing the operation of the inhibiting signal generating circuit shown in FIG. 12.

In the structure shown in FIG. 10, a region inhibited from low-frequency replacement may be longer before occurrence of dropout as compared with that after occurrence of the dropout. It may be considered to symmetrize the period for inhibiting low-frequency replacement with respect to a portion causing dropout. FIG. 12 shows such structure. Referring to FIG. 12, a delay circuit 18a receives a dropout detection signal and a retriggerable monomulti 18b receives an output signal from the delay circuit 18a as a trigger signal. The delay circuit 18a has a predetermined delay time $T - \Delta T$. The retriggerable monomulti 18b receives the trigger signal from the delay circuit 18a, to output a pulse signal having pulse width of 2 T. An output signal from the retriggerable monomulti 18b is supplied to the replacement limiting circuit 15 as a control signal. The operation of the circuit shown in FIG. 12 is now described with reference to FIG. 13, which is an operation waveform diagram thereof. Upon supply of dropout detection output, the corresponding dropout portion is supplied to the first input of the replacement limiting circuit 15 from the subtracter 14 after a lapse of a time T. On the other hand, the delay circuit 18a outputs a dropout detection signal in a delay by the time $T - \Delta T$. The retriggerable monomulti 18b receives the delayed dropout detection signal from the delay circuit 18a as a trigger signal and outputs the signal having the pulse width 2 T, to supply the same to the replacement limiting circuit 15. In response to the signal from the retriggerable monomulti 18b, the replacement limiting circuit 15 switches its input contact, to inhibit low-frequency replacement. As seen from FIG. 13, the period in which low-frequency replacement is inhibited by the replacement limiting circuit 15 necessarily includes timing for low-frequency replacement of the dropout portion. According to the structure shown in FIG. 12, therefore, it is not necessary to inhibit low-frequency replacement exactly at the output timing of the dropout portion from the subtracter 14, but low-frequency replacement of the data including the dropout portion can be easily inhibited.

In the aforementioned embodiment shown in FIGS. 7, 10 and 12, only the portion relating to dropout is inhibited from low-frequency replacement within the scene. However, it may be considered to entirely inhibit low-frequency replacement after a MUSE signal with dropout is inputted. Description is now made on structure for entirely inhibiting low-frequency replacement in response to such occurrence of dropout.

Figure 14:
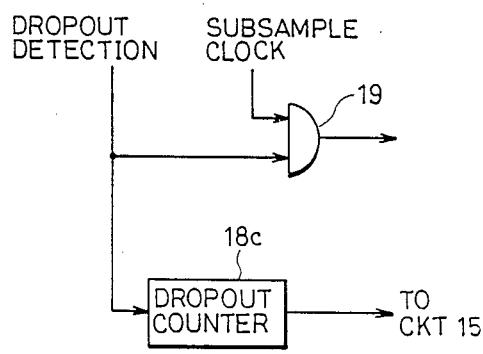
FIG. 14 illustrates the structure of an inhibiting signal generating circuit according to a fourth embodiment of the present invention.
Figure 15:
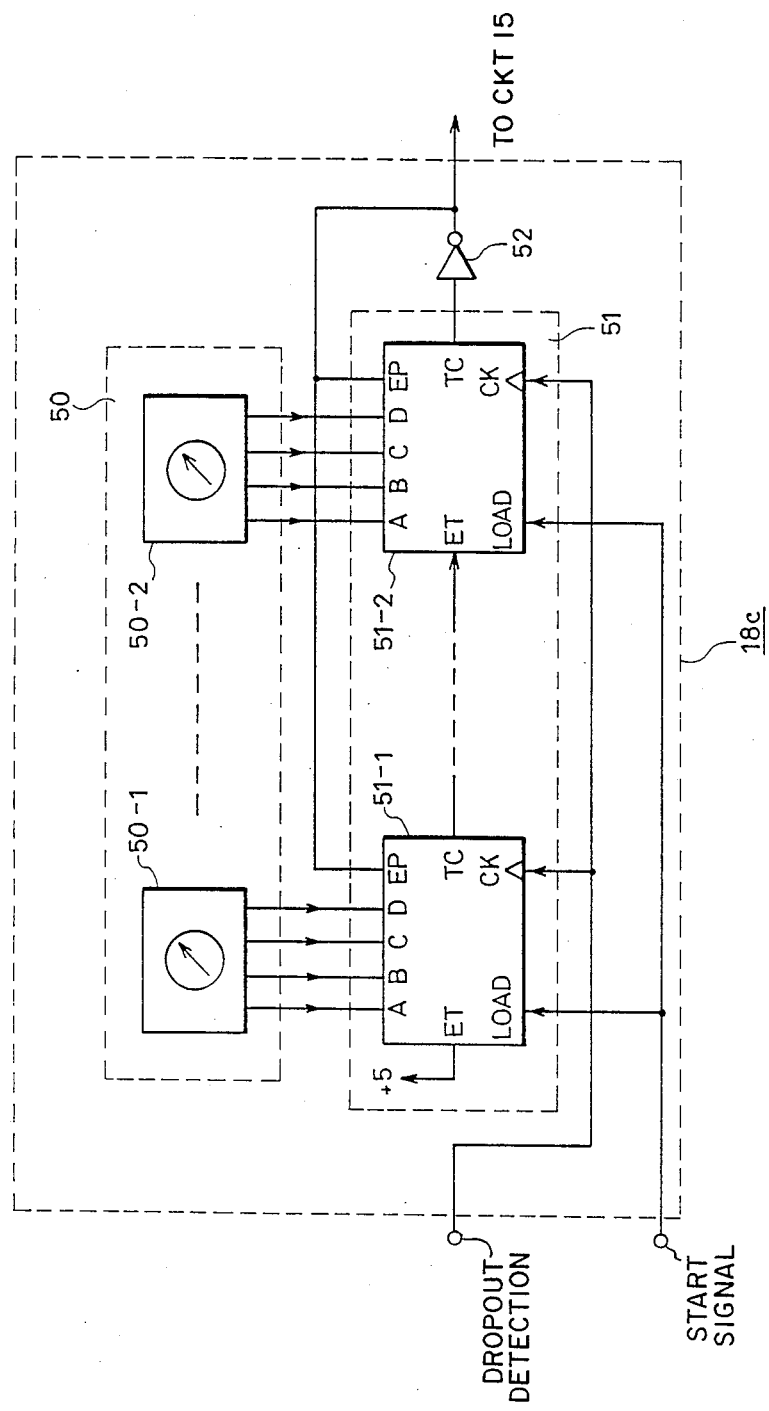
FIG. 15 illustrates exemplary structure of a dropout counter shown in FIG. 14.

FIG. 14 shows exemplary structure for entirely inhibiting low-frequency replacement upon occurrence of dropout in response to dropout detection output. Referring to FIG. 14, a dropout counter 18c is adapted to count dropout detection signals to supply a replacement inhibiting signal to a replacement limiting circuit 15 when the dropout detection signals reach a prescribed number. FIG. 15 shows exemplary structure of the dropout counter 18c. Referring to FIG. 15, the dropout counter 18c comprises a set switch 50 for setting a count value, a counter 51 for counting the dropout detecting signals and outputting a count-up signal when the count value thereof reaches a prescribed value, and an inverter 52 for inverting the signal indicating that the count value reaches the prescribed value received from the counter 51 and outputting the inverted signal.

The set switch 50 has set switch circuits 50-1 and 50-2, which set predetermined numerical values respectively to set the number of the dropout detection signals to be counted. The switch circuits 50-1 and 50-2 set values corresponding to respective digits of the count number of the detection signals to be counted.

The counter 51 has counter circuits 51-1 and 51-2, which are similar in structure to each other. Each of the counter circuits 51-1 and 51-2 has terminals A, B, C and D for inputting initialization values, a terminal ET for receiving an activation signal, a terminal TC for outputting a count completion, i.e., carry signal, a load terminal LOAD for receiving an instruction signal of inputting the set value from the corresponding switching circuit, a clock input terminal CK for receiving a clock signal and a terminal EP for receiving a counting operation inhibiting signal. A start signal is applied to the terminal LOAD. The dropout detection signal is supplied to the clock signal input terminal CK. The activation signal input terminal ET of the counter circuit 51-1 is connected to a prescribed power source +5 V. The carry signal output terminal TC of the counter circuit 51-1 is connected to the activation signal input terminal ET of the counter circuit 51-2. The carry signal output terminal TC of the counter circuit 51-2 is connected to an input of the inverter 52. An output terminal of the inverter 52 is connected to the inhibiting signal input terminals EP of the counter circuits 51-1 and 51-2, and supplied to the replacement limiting circuit 15. An output signal from the inverter 52 serves as a control signal for the low-frequency replacement limiting circuit 15. The start signal for starting the dropout counter 18c is connected to a power supply line for the MUSE decoder MD, and generated following power supply to the MUSE decoder MD. With reference to FIG. 15, the operation of the dropout counter 18c is now described. A prescribed count value is set at the set switch 50. A start signal is generated in response to turn-on of power supply to the MUSE decoder MD. The counter 51 responsively loads the count value set in the set switch 50 as an initial value. The counter 51 has not yet performed any counting operation upon power-on and outputs a low-level signal. Thus, the inverter 52 outputs a high-level signal, and hence the replacement limiting circuit 15 sets its input contact to perform low-frequency replacement. When a dropout detection signal is supplied, the counter 51 starts countdown operation from the value set by the set switch 51. When the count value of the counter 51 reaches zero as the result of the countdown operation, the counter 51 outputs a high-level signal on the judgement that the dropout detection signals reach a prescribed number of times. The signal indicating count completion is converted to a low-level signal through the inverter 52, and applied to the replacement limiting circuit 15. In response to this, the replacement limiting circuit 15 switches its input terminal to the ground potential, thereby to inhibit low-frequency conversion operation. Operation of the counter circuits 51-1 and 51-2 is now briefly described. The counter circuit 51-1, which is supplied with the source potential +5 V in its activation signal input terminal ET, is normally in an operable state. This counter circuit 51-1 loads the set value from the set switch circuit 50-1, and thereafter counts every dropout detection output, to perform sequential countdown operation from the set value. When the count value reaches zero, the counter circuit 51-1 outputs a carry signal from its output terminal TC, and supplies the same to the counter circuit 51-2, for example, of a subsequent stage. The counter circuit 51-2 of the subsequent stage enters a counting enabled state when an activation signal is supplied from the counter circuit 51-1 of the front stage. When a subsequent dropout detection signal is supplied in this state, both of the counter circuits 51-1 and 51-2 count the dropout detection output. Since the count value of the counter circuit 51-1 is nonzero at this time, a low-level signal is outputted from its carry signal output terminal TC. Thus, the counting operation of the counter circuit 51-2 is inhibited and the counter circuit 51-1 again performs counting operation. When the initial value is counted up in the counter circuit 51-2 through repetition of the aforementioned operation, the counter circuit 51-2 outputs a carry signal (high-level signal). The counter circuits 51-1 and 51-2 are inhibited from counting operation when low-level signals are applied to the respective terminals EP. Therefore, after the dropout detection outputs are counted by the prescribed number, the counter circuit 51 continuously outputs a high-level signal.

In the aforementioned structure, low-frequency replacement operation of the composite data is entirely inhibited after the dropout detection signals reach the prescribed number. Thus, low-frequency replacement of the composite data is performed unless dropout occurs by a prescribed number of times.

In the structure shown in FIG. 15, the counter is reset (initialized) in response to turn-on of power supply to the MUSE decoder MD. Alternatively, a step-out phenomenon of a given MUSE signal may be detected to employ a step-out detection signal as a start signal for the dropout counter 18c, thereby to attain an effect similar to the above.

As shown in FIG. 6A, for example, the frame pulse for providing vertical synchronization and the horizontal synchronizing signal for providing horizontal synchronization are inserted in the MUSE signal. The synchronizing signals (the frame pulse and the horizontal synchronizing signal) are separated by the control/sync separation circuit 4 shown in FIG. 7, to be synchronized with the reproduced MUSE signal. However, although a MUSE decoder is structured to perform signal processing in synchronization with the synchronizing signals, a step-out state is present until synchronization is stabilized in a video disk player or the like, for example. In this case, the step-out phenomenon can be detected by dropout of the frame pulse or the like. In response to the detected step-out phenomenon, the clock pulse generator 5 outputs a pulse train signal (step-out signal). Low-frequency replacement can be inhibited when a prescribed number of dropout detection signals are present after synchronization is stabilized, by employing the step-out signal as a start signal for the counter. Such a step-out period is mainly caused in an initial stage of disk reproduction in the case of a video disk player or the like, and the counter can be made operable only in disk reproduction after power-on of the MUSE decoder, i.e., only in a necessary time.

Figure 16:
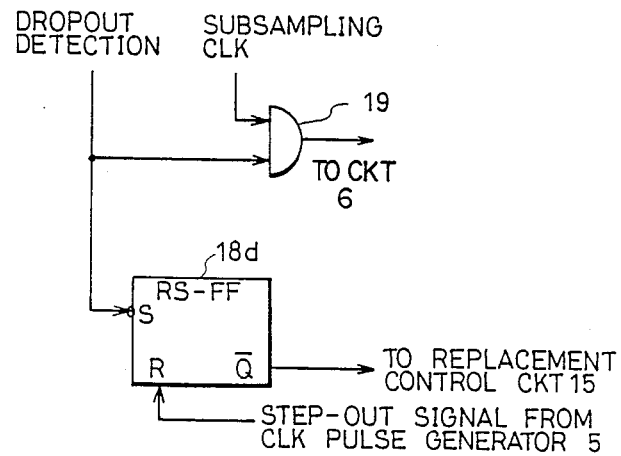
FIG. 16 illustrates the structure of an inhibiting signal generating circuit according to a fifth embodiment of the present invention.

In the counter structure shown in FIG. 15, low-frequency replacement is inhibited only when the dropout detection output signals are received in excess of a prescribed number of times. In this case, the picture quality may be deteriorated since low-frequency replacement is performed on a dropout portion before the drop-out signals reach the prescribed number. In this regard, it is also possible to employ alternative structure of entirely inhibiting low-frequency replacement upon supply of any dropout detection signal. FIG. 16 shows an example of such structure.

Referring to FIG. 16, a reset/set flip-flop 18d is provided as low-frequency replacement inhibiting signal generating means. The reset/set (RS) flip-flop 18d receives a dropout detection output signal in its set input, while receiving a step-out signal, which is outputted from the clock pulse generator 5 upon occurrence of a step-out phenomenon, in its reset input terminal. A low-frequency replacement control signal is outputted from a $\bar{Q}$ terminal of the RS flip-flop 18d. Operation is now briefly described. The RS flip-flop 18d enters a set state when dropout detection output (low level) is supplied to its set input, and outputs a low-level signal from the $\bar{Q}$ output terminal to supply the same to the replacement limiting circuit 15. In response to such low-level signal, the replacement limiting circuit 15 inhibits low-frequency replacement. The RS flip-flop 18d is reset by a step-out signal (pulse train signal) supplied from the clock pulse generator 5. Thus, the RS flip-flop 18d entirely inhibits low-frequency replacement upon supply of any dropout detection output after synchronization is stabilized.

Figure 17:
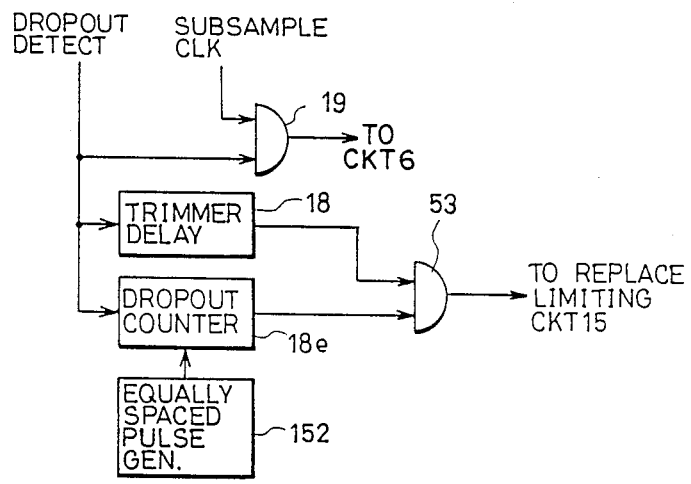
FIG. 17 illustrates the structure of an inhibiting signal generating circuit according to a sixth embodiment of the present invention.

It may be further considered to entirely inhibit low-frequency replacement when dropout is caused in excess of a prescribed number within a prescribed period. FIG. 17 shows an example of such structure. Referring to FIG. 17, a low-frequency replacement control signal generator includes a trimmer delay circuit 18 for delaying dropout detection output by a prescribed time T and outputting the same, a dropout counter 18e for counting the dropout detection output, an AND gate 53 for receiving outputs from the trimmer delay circuit 18 and the dropout counter 18e and an equally-spaced pulse generator 52 for defining a count cycle in the dropout counter 18e. The trimmer delay circuit 18, which is similar to that shown in FIG. 7, is adapted to match in sampling phase A-D converted data from the A-D converter 3, and the composite data from the mixer 11 outputted through the subtracter 14. The equally-spaced pulse generator 152 frequency-divides pulse signals supplied for the clock pulse generator 5, for example, at a prescribed ratio to output a pulse signal train, thereby to decide the cycle of counting operation of the dropout counter 18e. The dropout counter 18e counts the number of dropout up to a predetermined set number within the cycle of the pulses from the equally-spaced pulse generator 152, to stop counting operation when the number reaches the preset count value while simultaneously outputting a low-frequency replacement inhibiting signal. The AND gate 53 outputs a high-level signal only when both of outputs from the trimmer delay circuit 18 and the dropout counter 18e are at high levels. Thus, the AND gate 53 outputs a signal for inhibiting replacement of only a dropout portion before the dropout reaches the prescribed number, while outputting a signal for entirely inhibiting low-frequency replacement after the dropout reaches the prescribed number.

Figure 18:
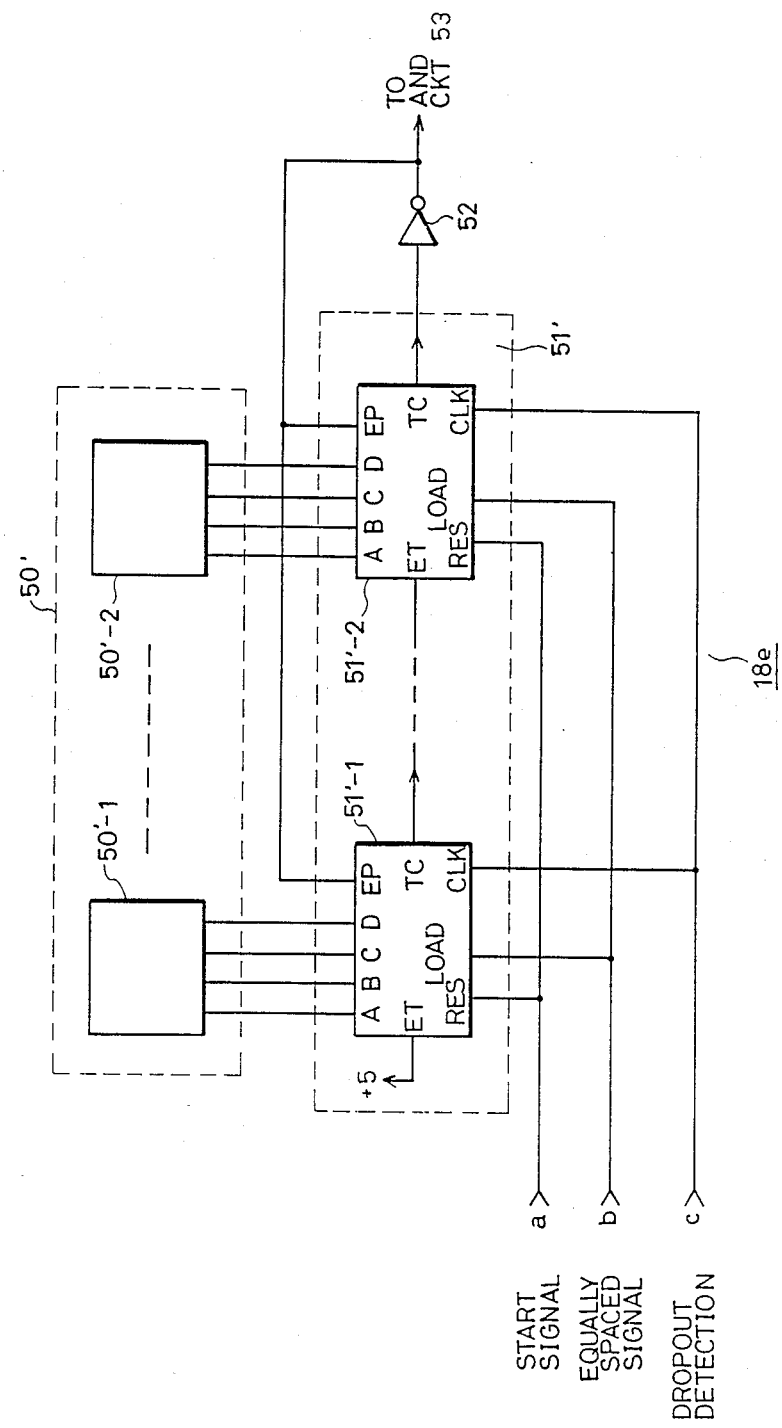
FIG. 18 illustrates exemplary structure of a counter shown in FIG. 17.
Figure 19:
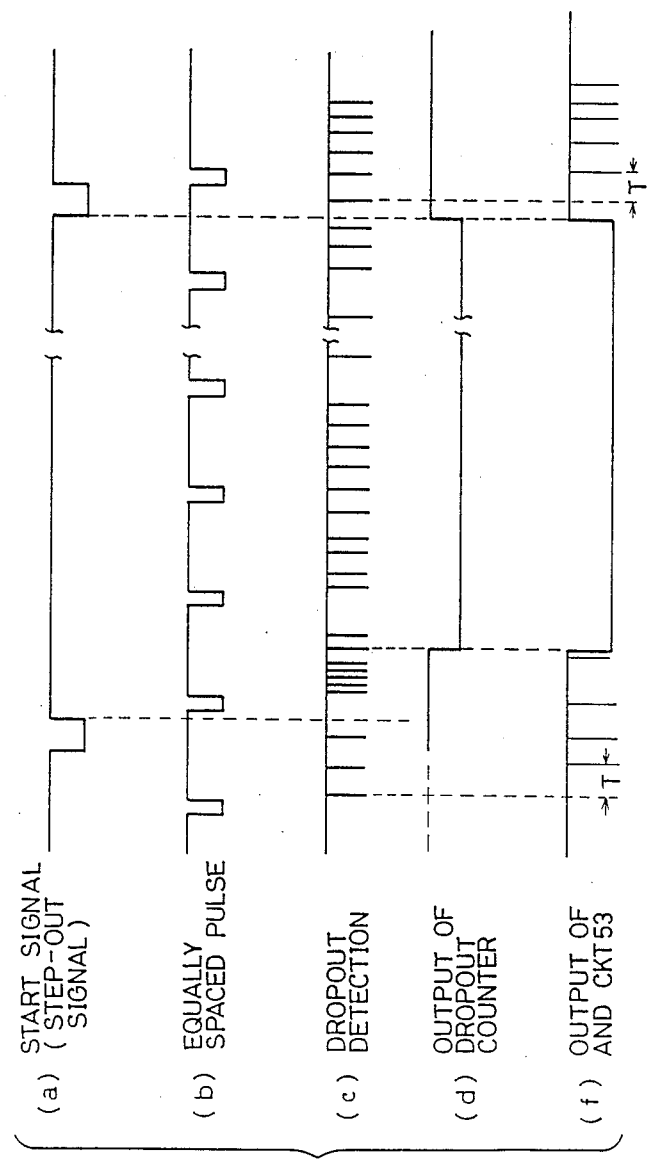
FIG. 19 is a signal waveform diagram showing the operation of the circuit shown in FIG. 17.

FIG. 18 shows exemplary structure of the dropout counter 18e. The dropout counter 18e, which is similar in structure to the counter shown in FIG. 15, comprises a set switch 50' for setting a count value serving as an initial value, a counter 51' for counting dropout detection signals in the cycle defined by equally spaced pulses from the equally-spaced pulse generator 152 and the inverter 52 for inverting output form the counter 51' and outputting the inverted output. The set switch 50' comprises set switch circuits 50'-1 and 50'-2 for setting count values respectively. The counter 51' has counter circuits 51'-1 and 51'-2. Each of the counter circuits 51'-1 and 51'-2 comprises input terminals A, B, C and D for receiving initial values from the set switch 50', an input terminal ET for receiving an activation signal, a terminal EP for receiving a signal for inhibiting counting operation, a terminal TC for outputting a carry signal, a clock terminal for receiving dropout detection output, a terminal for receiving the equally spaces pulses as load command signals and a reset terminal for receiving a start signal. Each of the counter circuits 51'-1 and 51'-2 loads a value set at the set switch 50' every time an equally spaced pulse is supplied. FIG. 19 is an operation waveform diagram of the counter shown in FIG. 18. With reference to FIGS. 18 and 19, the operation of the counter 18e is now described. The equally-spaced pulse generator 52 (see FIG. 17) outputs equally spaced pulse signals on the basis of pulse signals supplied from the clock pulse generator 5, for example. The equally spaced pulses define the cycle of counting operation of the dropout counter 18e. The counter 51' loads a value set in the set switch 51' and initializes counting operation every time an equally spaced pulse is supplied. Further, the counter 51' resets its counter value and initial value every time a start signal (step-out signal) is supplied. When a value from the set switch 50' is loaded in the counter 51' as an initial value, counting of dropout detection outputs is enabled until a next equally spaced pulse is supplied. When dropout detection outputs are supplied, the counter 51' counts the number thereof. When the number of the dropout detection outputs reaches a value set by the set switch 50', the counter circuit 51'-2 of the counter 51' outputs a carry signal of a high level. This carry signal is inverted by the inverter 52 and then supplied to the AND gate 53. A low-level signal from the inverter 52 is supplied to the counter circuits 51'-1 and 51'-2, whereby counting operation of the counter 51' is inhibited. Consequently, the AND gate 53 continuously supplies a low-level signal to the low-frequency replacement limiting circuit 15, thereby to entirely inhibit low-frequency replacement.

It is assumed here that N represents a set number to be counted by the counter 51'. If the counter 51' is formed by an n-ary counter, the set switch 51' first sets (n−N). That is, the counter 51', whose initial value is set at (n−N) in loading, outputs a carry signal upon counting N dropout detection signals in one cycle of the equally spaced pulses. This operation also applies to the counter circuits 51'-1 and 51'-2.

Although the step-out signal is employed as a start signal in the aforementioned embodiment, an effect similar to the above can be also attained by employing another control pulse supplied from the exterior or a pulse signal generated simultaneously with turn-on of power supply to the MUSE decoder MD.

Further, although the count value is reset by the start signal in the structure of the counter 51' shown in FIG. 18, not only loading but resetting may be simultaneously performed by the equally spaced pulses. In this case, a latch circuit must be provided for latching the output of the counter 51' so that the output thereof is not inverted in resetting.

In the aforementioned structure, the number of the dropout detection outputs is counted. However, low-frequency replacement may be inhibited by detecting a period in which the dropout detection output is inputted. That is, a clock signal is supplied to a separately provided period detecting counter through switching means (gate circuit) upon supply of dropout detection output. Low-frequency replacement may be inhibited when the counter counts a prescribed number of the clock signals within a prescribed period. The period detecting counter is reset every prescribed period. Also in this case, low-frequency replacement is inhibited when dropout detection outputs are supplied in excess of a prescribed number within a prescribed period.

In each of the aforementioned embodiments, the composite data from the mixing circuit 11 and the low-frequency component of the A-D converted data from the A-D converter 3 are added up and the low-frequency component of the composite data from the mixing circuit 11 is subtracted in low-frequency replacement. However, the low-frequency component of the composite data or the A-D converted data may be selectively added to intermediate and high frequency components of the composite data. In this case, such selective addition is switched by dropout detection output.

In the aforementioned structures, the output of the subtracter 14 is switched in response to the dropout detection output. However, low-frequency replacement can also be controlled with no employment of such a switching circuit.

Figure 20:
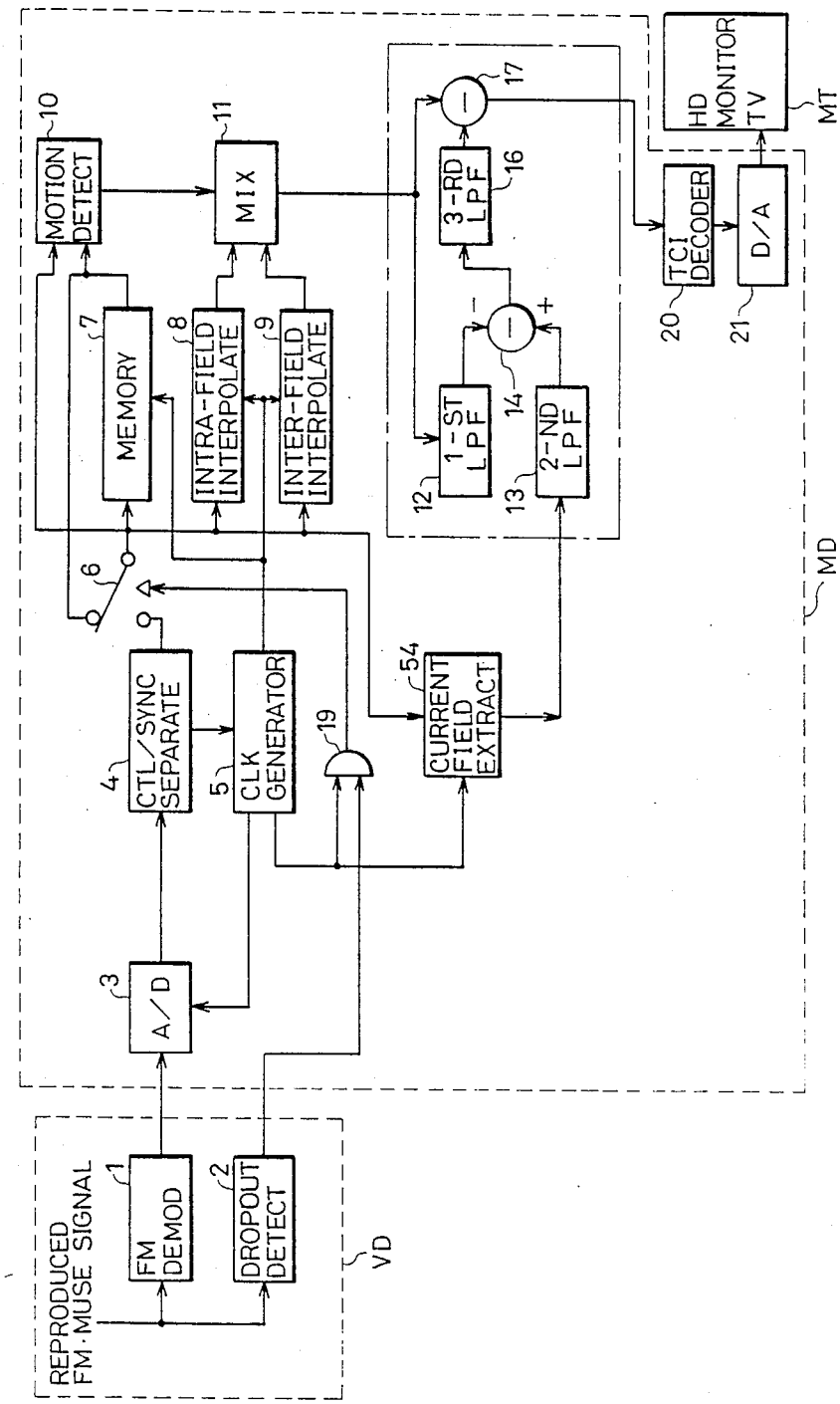
FIG. 20 illustrates the structure of a MUSE decoder according to a seventh embodiment of the present invention.

FIG. 20 shows exemplary structure for inhibiting low-frequency replacement upon occurrence of low-frequency dropout while employing no replacement limiting circuit formed by switches. Referring to FIG. 20, a current field signal extracting circuit 54 is provided in order to latch data in response to a subsampling clock from a clock pulse generator 5. Output from the current field signal extracting circuit 54 is supplied to a second digital low-pass filter 13. As hereinabove described, an input switching circuit 6 alternately outputs data of the current field and that preceding by two fields. The input switching circuit 6 switches the input terminal in response to the subsampling clock of 16.2 MHz and samples a received signal at 32.4 MHz. Thus, the frequency of a sampling clock in the current field signal extracting circuit 54 is made half the sampling frequency of 32.4 MHz in the input switching circuit 6, thereby to be able to latch the data only of the current field. At this time, the input switching circuit 6 outputs data preceding by four fields within feedback data stream from a memory 7 for a dropout portion, and hence the data preceding by four fields is latched for the dropout portion. Namely, according to this structure, the data of the current field already subjected to dropout compensation with the data preceding by four fields in the input switching circuit 6 is supplied to the second digital low-pass filter 13. Therefore, no picture noise is caused by the dropout, when low-frequency replacement of the composite data from the mixing circuit 11 is performed with a signal from the current field signal extracting circuit 54, since dropout compensation is already performed.

Each of the aforementioned embodiments is on the premise that dropout detection means is provided in MUSE reproducing means. Hence, desired dropout compensation cannot be performed when MUSE reproducing means deriving no dropout detection output is combined with such a MUSE decoder. In each of the aforementioned embodiments, further, merely dropout compensation is performed and large-amplitude pulsing noise cannot be suppressed. Description is now made on structure in which a MUSE decoder detects even a large-amplitude noise for compensating the same, in addition to dropout compensation. First, a part of a signal processing system in the MUSE system is described with reference to FIGS. 21A and 21B. A MUSE signal formed on a MUSE encoder side is subjected to processing for SN improvement and thereafter supplied to a transmission system including a recording-/reproducing system. The processing for SN improvement is performed by an emphasizer 28 and a nonlinear processing circuit 29. The emphasizer 28 receives an 8-bit current signal (A), performs high-frequency emphasis thereon and converts the signal to a 10-bit signal to output the same. The nonlinear processing circuit 29 nonlinearly compresses a high-level component of the signal from the emphasizer 28. The nonlinearly processed signal is analog-converted as a MUSE signal (C), to be supplied to transmission means or recording means. In general emphasis processing, the high-frequency component of the processed signal is emphasized and its level is increased. When such an emphasized signal is modulated to an FM signal, frequency deviation is spread. In order to prevent excessive spreading of such frequency deviation, the nonlinear processing circuit 29 performs nonlinear processing shown in the block in FIG. 21A, to suppress the dynamic range of the signal. Further, C/N required for a transmission path can be reduced by such emphasis, thereby to improve SN. Transmission means and receiving means or recording means and reproducing means form a transmission system in the above description and the following embodiment of the present invention. A received or reproduced MUSE signal is converted to 10-bit digital data in the MUSE decoder and supplied to another nonlinear processing circuit 30. The nonlinear processing circuit 30 performs nonlinear processing which is reverse in characteristic to the nonlinear processing circuit 29 provided in the encoder side. That is, the nonlinear processing circuit 30 relatively emphasizes a high-level component of the signal as compared with its low-level component. Nonlinear-processed output (D) which is equal in characteristic to output from the emphasizer 28 is obtained from the nonlinear processing circuit 30. The nonlinear processed output (D) is subjected to suppression of a high-frequency component in a de-emphasizer 31, and converted to an original 8-bit MUSE signal to be outputted. The de-emphasizer 31 is reverse in processing characteristic to the emphasizer 28.

However, when dropout or pulsing noise is caused, output (E) of the de-emphasizer 31 cannot be expressed by data within eight bits but the same goes to a level of at least nine bits exceeding a level 768 or below a level 256, as shown in FIG. 21B. In 8-bit indication, levels between 768 and 256 shown in FIG. 21B are indicates as 8-bit data. Nine bits are required in order to indicate data out of these levels. Therefore, a de-emphasized output level can be regarded as normal when high-order two bits of data converted to 10 bits are in a combination of "0" and "1", while it can be regarded that dropout or pulsing noise is caused when the high-order two bits are "00" or "11". In the following embodiment, therefore, an output level of the de-emphasizer 31 is judged to detect dropout and pulsing noise.

Figure 22:
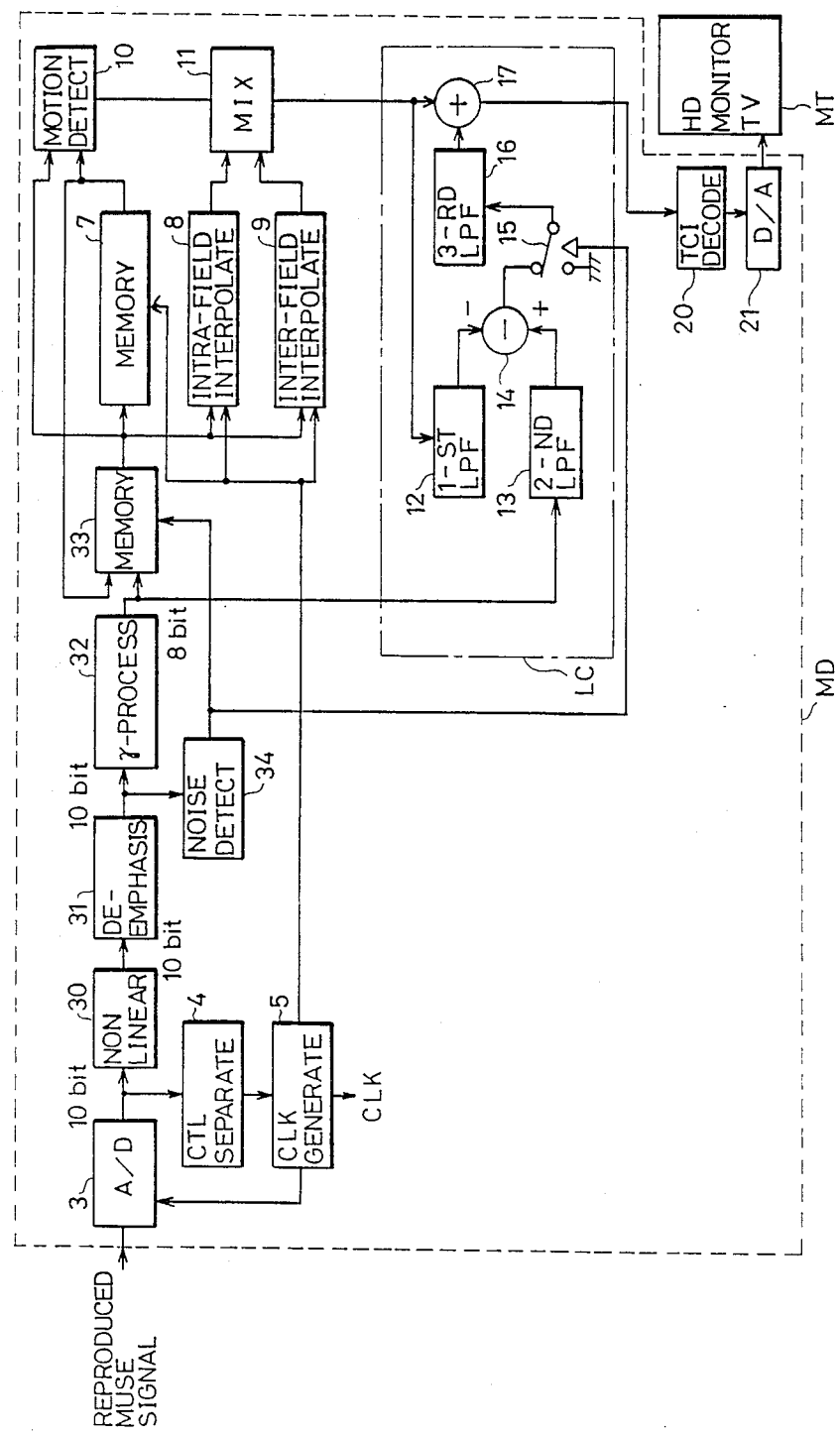
FIG. 22 illustrates the structure of a MUSE decoder according to an eighth embodiment of the present invention.

FIG. 22 shows circuit structure of a MUSE decoder having a function of deriving dropout and pulsing noise detection signals in the interior of the decoder. Referring to FIG. 22, components identical or corresponding in structure to those shown in FIGS. 7 and 20 are indicated by the same reference numerals, to appropriately omit redundant description.

Referring to FIG. 22, 10-bit A-D converted data from an A-D converter 3 is supplied to the nonlinear processing circuit 30 having a nonlinear characteristic which is shown in FIG. 21A, and the de-emphasizer 31 having a de-emphasis characteristic which is shown in FIG. 21A. The de-emphasizer 31 outputs 10-bit data. The output from the de-emphasizer 31 is supplied to a gamma processing circuit 32. The gamma processing circuit 32 relatively suppresses a low-level portion as compared with a high-level portion, thereby to perform nonlinear processing for improving SN in vision. The gamma processing circuit 32 converts the nonlinearly processed data into 8-bit data, and supplies the same to a noise reduction circuit 33 and a second digital low-pass filter 13.

The noise reduction circuit 33 is a well-known circuit which compares data preceding by four fields fed back from a memory 7 with newly supplied data to change the mixing ratio for these data in response to level difference between signals thereof. When the newly supplied data largely differs from the data preceding by four fields, the noise reduction circuit 33 regards that the data is that of a motion picture portion, and sets the mixing ratio of the newly inputted data at a large value. When levels of tho data are approximate to each other, on the other hand, the noise reduction circuit 33 regards that the picture is a still picture, and sets the mixing ratio of the feedback data from the memory 7 at a large value. Upon occurrence of dropout or generation of pulsing noise, therefore, the noise reduction circuit 33 regards that the picture is a motion picture since the newly inputted data largely differs from the data preceding by four fields, to output the data including noise such as dropout and pulsing noise as received. Thus, a noise detecting circuit 34 is provided to inhibit noise reduction operation of the noise reduction circuit 33 upon such noise generation and to selectively output the data preceding by four fields fed back from the memory 7.

The structure of the noise reduction circuit 33 is described below.

The noise detecting circuit 34 is formed by an exclusive OR (EX-OR) circuit (see FIG. 21B) which receives high-order two bits within 10-bit data from the de-emphasizer 31, for example. When pulsing noise or dropout is caused, therefore, its output becomes zero since two inputs thereof coincide with each other, and this circuit inhibits noise reducing operation of the noise reduction circuit 33 and passes only the feedback data from the memory 7. Thus, the feedback data outputted from the memory 7 is written in the memory 7 upon occurrence of dropout or generation of pulsing noise, and hence no data corresponding to dropout or pulsing noise is inputted in the memory 7. A noise detection signal from the noise detecting circuit 34 is supplied to a replacement limiting circuit 15. Similarly to the above, a prescribed delay means is provided between the noise detecting circuit 34 and the low-frequency replacement limiting circuit 15. Thus, the low-frequency component of the composite data from the mixing circuit 11 is prevented from replacement by data of the dropout or pulsing noise. According to the aforementioned structure, dropout compensation and noise reduction can be performed even if a MUSE reproducer having no dropout detecting function or a receiver having no noise detecting function is connected to the MUSE decoder.

Figure 23:
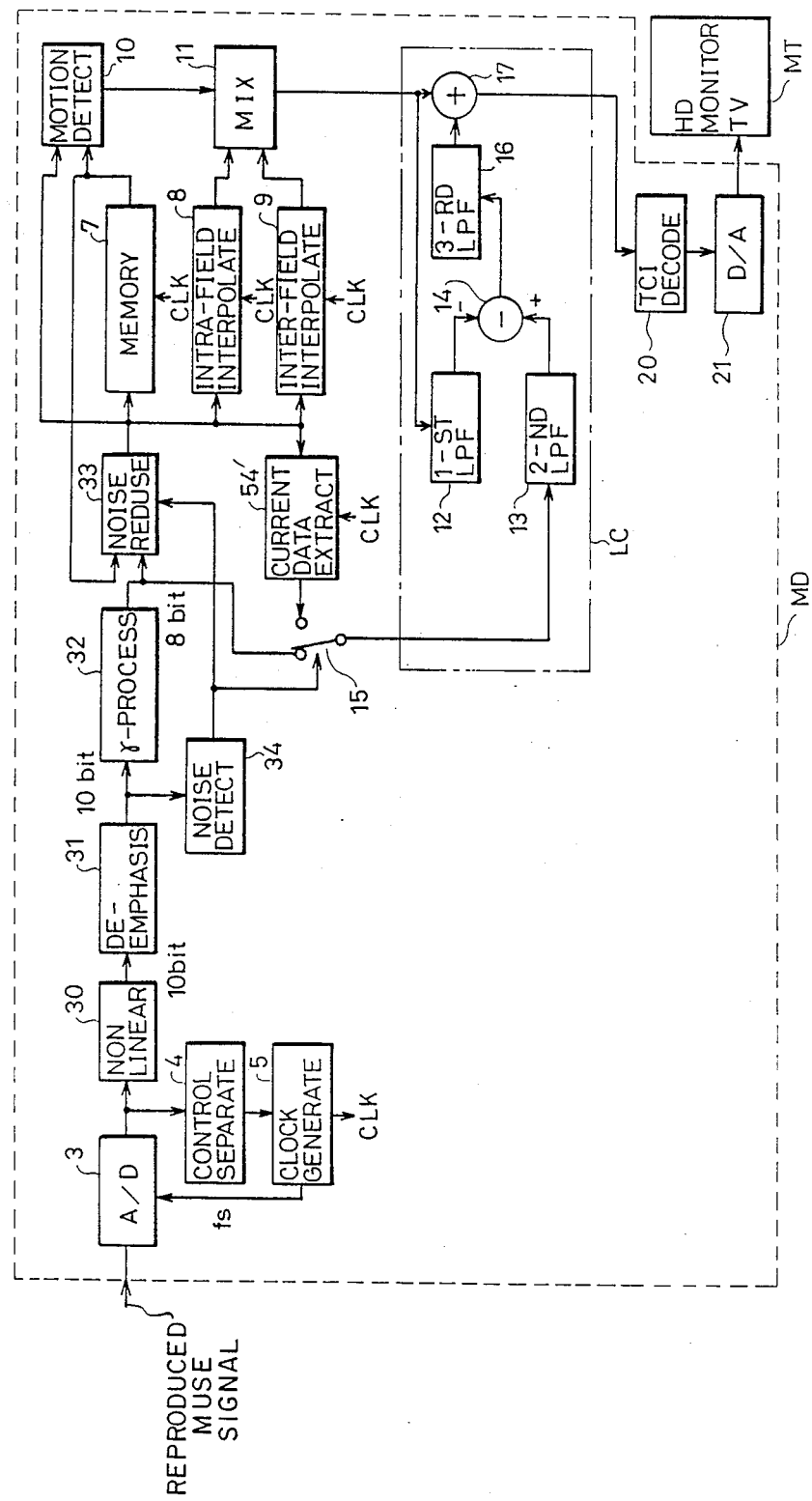
FIG. 23 illustrates the structure of a MUSE decoder according to a ninth embodiment of the present invention.

With reference to FIG. 23, the structure of a further embodiment is now described. Also in FIG. 23, parts corresponding to those in FIG. 22 are indicated by the same reference numerals. Referring to FIG. 23, a current field signal extracting circuit 54' receives output from a noise reduction circuit 33 and extracts data corresponding to the current field, and a selector switch 15' selectively passes either output data from a gamma processing circuit 32 or output data from the current field signal extracting circuit 54' in response to a noise detection signal from a noise detecting circuit 34 and supplies the same to a second digital low-pass filter 13.

Figure 24:
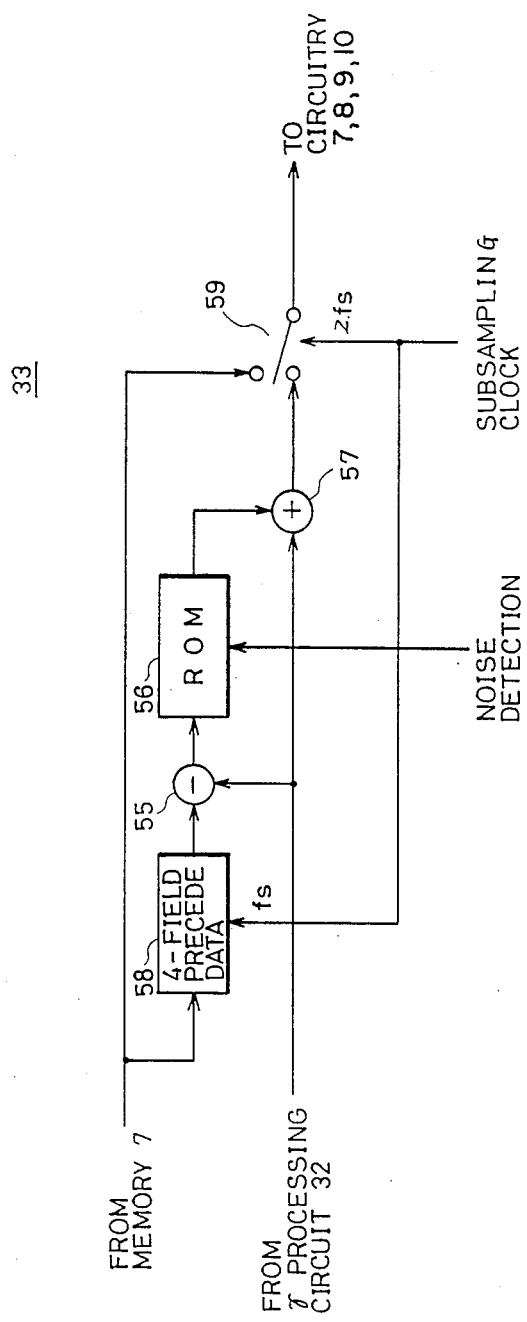
FIG. 24 illustrates exemplary structure of a noise reduction circuit shown in FIG. 22 or 23

FIG. 24 shows exemplary structure of the noise reduction circuit 33. Referring to FIG. 24, the noise reduction circuit 33 is provided with a four-field-preceding signal extracting circuit 58 for extracting a signal preceding by four fields from feedback data from the memory 7, a subtracter 55 for performing subtraction of data from the four-field-preceding signal extracting circuit 58 and the data of the current field from the gamma processing circuit 32, a ROM circuit 56 for making a decision on motion picture/still picture in response to a difference signal (absolute value signal) from the subtracter 55 and multiplying the signal preceding by four fields by a mixing ratio depending on the decision result for outputting the result of multiplication, an adder 57 for adding up output data from the ROM circuit 56 and the data from the gamma processing circuit 32, and a switching circuit 58 for alternately outputting the feedback data from the memory 7 and output from the adder 57 in response to subsampling clocks supplied from the clock pulse generator 5.

The noise reduction circuit 33 is adapted to reduce noise having non correlation with the picture which is superimposed on a transmission path. Data having strong correlation must be employed in order to reduce the random noise having no correlation to the picture. In the MUSE signal, the current field data is strongly correlated with the signal preceding by two frames (preceding by four fields), since their sampling phase coincide with each other. Therefore, a signal preceding by two fields is removed by the four-field-preceding signal extracting circuit 58, so that only the signal preceding by four fields is outputted. The ROM circuit 56 receives the absolute value of the difference signal from the subtracter 55 as address input, and multiplies the data from the four-field-preceding signal extracting circuit 58 and the current field data from the gamma processing circuit 32 by a predetermined coefficient (stored to be developed in the form of a table, and the ROM forms a look-up table) to output the result of multiplication. The adder 57 adds up the multiplication data from the ROM circuit 56 and the output from the gamma processing circuit 32. Thus, the adder 57 outputs data obtained by mixing the output data from the four-field-preceding signal extracting circuit 58 and the current field data at a mixing ratio responsive to signal difference therebetween. Namely, in response to the difference signal from the subtracter 55, the ROM circuit 56 outputs a corresponding coefficient $\alpha$ using the difference signal as the address the input, and multiplies output (x) from the four-field-preceding signal extracting circuit 58 and output (y) from the gamma processing circuit 32. Thus, the ROM circuit 56 outputs $\alpha x - \alpha y$. Consequently, the adder 57 outputs $\alpha x + (1-\alpha)y$. In response to the noise detection output from the noise detecting circuit 34, the ROM circuit 56 performs multiplication on the assumption that its coefficient $\alpha$ is "1", for example, and outputs the result of multiplication. Therefore, when the noise detecting circuit 34 supplies a noise detection signal, the component of the data of the current field signal becomes zero and signal data preceding by four fields are directly outputted. The output of the adder 57 is supplied to a selector switch 59. The selector switch 59 alternately outputs the feedback data from the memory 7 and the data from the adder 57 in response to the subsampling clocks. When no noise is caused, therefore, the selector switch 59 outputs a data train, in which the current field data subjected to noise reduction and the data preceding by two fields are alternately arranged. When the noise detecting circuit 34 supplies noise detection output, on the other hand, the selector switch 59 alternately outputs the data preceding by four fields and the data preceding by two fields. A random noise component superimposed on a transmission path and having no correlation to the picture can be reduced by mixing the data signal of the current field and the data signal preceding by four fields in the aforementioned manner.

Referring to FIG. 23, the selector switch 15' selects the current field signal extracting circuit 54' when the noise detecting circuit 34 detects noise, while selecting the output of the gamma processing circuit 32 when the noise detecting circuit 34 detects no noise. The current field signal extracting circuit 54' replaces a noise portion by the signal preceding by four fields and outputs the current field signal data upon generation of noise such as dropout, while outputting output data from the noise reduction circuit 33 directly as data corresponding to the current field in other case (see FIG. 8).

In the embodiment shown in FIG. 23, output data from the gamma processing circuit 32 is supplied to the second digital low-pass filter 13 through the selector switch 15' when no noise (dropout or pulsing noise) is caused. However, when the mixing ratio of the signal preceding by two frames (four fields) mixed in the noise reduction circuit 33 is extremely small, the current field data outputted from the gamma processing circuit 32 is substantially identical to the current field data outputted from the current field signal extracting circuit 54', and hence the selector switch 15' may be omitted so that the output from the current field signal extracting circuit 54' is supplied to the second digital low-pass filter 13.

Although a dropout or noise portion is replaced by signal data preceding by four fields through the input switching circuit 6 or the noise reduction circuit 33 upon generation of noise such as dropout to compensate the dropout (noise) in each of the aforementioned embodiments (all embodiments shown in FIGS. 7 to 24), the noise portion may alternatively be replaced by a signal having line correlation. For example, the signal data preceding by four fields may be so employed as to normally compensate noise such as dropout, and to compensate dropout (or pulsing noise) by performing replacement by signal data preceding or subsequent by one line if an inputted MUSE signal is that for scene change (motion information is "3") in accordance with 16-th, 17-th and 18-th bit motion information (ratio of employment of forced spatial interpolation) of a control signal for the MUSE signal. The control signal is inserted in a prescribed position at the rate of 32 bits per field, and a control signal of the same content is transmitted three times for controlling each field (see FIG. 5). Briefly stated, first to fifth bits of the control signal designate a horizontal motion vector, sixth to eighth bits designate a vertical motion vector, the ninth bit indicates the subsampling phase of the Y (luminance) signal, the 10-th bit shows the subsampling phase of the C (chrominance) signals, the 11-th bit indicates a noise reducer control signal and the 12-th bit indicates interfield interpolation control.

According to the present invention, as hereinabove described, low-frequency replacement by a noise portion is inhibited when dropout (or pulsing noise) is caused in current field data in a MUSE decoder having a function of replacing a low-frequency component of composite data by that in the current field of an input MUSE signal, whereby no turbulence is caused on the screen of a high definition monitor television and therefore a picture of high definition can be obtained.

Further, since a signal subjected to interframe interpolation and noise compensation (as to dropout and pulsing noise) is employed to extract current field data thereby to perform low-frequency replacement of the composite data through the extracted signal, whereby no noise is caused in a reproduced picture and a picture of high definition can be obtained.

In addition, when a decoder is so structured to detect noise therein, dropout can be reliably compensated to provide a picture of high definition, even if the decoder is connected to a device having no dropout detecting ability.

Although the present invention has been described and illustrated in detail, it is clearly understood that the same is by way of illustration and example only and is not to be taken by way of limitation, the spirit and scope of the present invention being limited only the terms of the appended claims.

What is claimed is:

1. An apparatus for reproducing a high definition video signal through decoding of a received subsampled video signal, said subsampled signal being produced by subsampling a high definition video signal at least one time in response to at least one of a signal of an interframe and interfield off-set subsampling frequency causing no aliasing noise in a low frequency range of the subsampled signal, said apparatus comprising:

conversion means for converting said subsampled signal to digital data and for deriving digital data of a current field;

switching means for receiving feedback data in which digital data preceding by at least one of substantially two fields and one field and digital data preceding by at least one of substantially four fields and two fields with respect to said digital data of the current field are alternately arranged and for outputting a data train in which first data corresponding to said current field data and said data preceding by at least one of two fields and one field are alternately arranged, said switching means including first means for deriving said first data corresponding to said current field data from said conversion means and second means for replacing said data preceding by at least one of four and two fields in said feedback data into said first data;

delay means for storing output data from said switching means and for deriving said feedback data train;

intrafield interpolation processing means for receiving data from said switching means and for performing intrafield interpolation processing on data appearing at a timing corresponding to said current field data out of the received data for deriving motion picture data;

still picture deriving means for receiving data from said switching means and for deriving still picture data;

mixing means for mixing said still picture data and said motion picture data at a mixing ratio determined by output data from a motion detecting circuit means for detecting motion of a picture;

low-frequency replacement means for receiving said current field data and composite data and for replacing a low-frequency component of said composite data by a predetermined low-frequency component of said first data;

first inhibiting means for inhibiting said low-frequency replacement in said low-frequency replacement means upon generation of noise including dropout in said subsampled video signal; and second inhibiting means for inhibiting replacement operation in said second means of said switching means upon generation of said noise.

2. An apparatus according to claim 1, wherein said subsampled video signal is an MUSE signal, said feedback data include a data train in which digital data preceding by two fields and digital data preceding by four fields with respect to said digital data of the current field are alternately arranged and said current field data, said switching means derives a data train in which said first data corresponding to the current field data and said data preceding by two fields are alternately arranged, said still picture deriving means receives data from said switching means and performs interfield interpolation processing on received data for deriving still picture data; and said motion detecting circuit means receives output data from said switching means and said feedback data.

3. An apparatus in accordance with claim 1, wherein said low-frequency replacement means includes:

first extracting means for extracting said predetermined low-frequency component of said first data corresponding to said current field data supplied from said conversion mean, and first replacement means for replacing said low-frequency component of said composite data by said low-frequency component of said first data extracted by said first extracting means, and said first inhibiting means includes:

inhibiting signal generating means for generating a low-frequency replacement inhibiting signal in response to a noise generation detection signal indicating detection of said noise, and inhibiting replacement means for inhibiting replacement operation in said first replacement means in response to an inhibiting signal from said inhibiting signal generating means.

4. An apparatus according to claim 3, wherein said inhibiting signal generating means includes delay means for delaying, by a predetermined time, said noise generation detection signal.

5. An apparatus in accordance with claim 3, wherein said inhibiting signal generating means includes pulse width extension means for extending pulse width of said noise generation detection signal in response to said noise generation detection signal.

6. An apparatus in accordance with claim 5, wherein said pulse width extension means includes counter means for counting a pulse number of said noise generation detection signal and for outputting said low-frequency replacement inhibiting signal when said count value reaches a prescribed value.

7. An apparatus in accordance with claim 3, wherein said first replacement means includes second extracting means for extracting said prescribed low-frequency component of said composite data, subtraction means for obtaining difference between outputs from said first and second extracting means, and adding means for adding up outputs of said subtraction means and said composite data, and said first inhibiting means includes isolating means for electrically isolating output of said subtraction means from input in said adding means in response to said low-frequency replacement inhibiting signal.

8. An apparatus in accordance with claim 1, wherein said first inhibiting means includes means for receiving said output data train from said switching means and for extracting said first data train for supplying the same to said low-frequency replacement means.

9. An apparatus in accordance with claim 1, wherein said first inhibiting means includes:

noise detecting means for receiving said current field train and for detecting presence/absence of said noise for generating a replacement inhibiting signal when said noise is present, and low-frequency inhibiting means for inhibiting said low-frequency replacement in said low-frequency replacement mean in response to a signal from an inhibiting signal generating means.

10. An apparatus in accordance with claim 9, wherein said low-frequency replacement means includes:

first extracting means for receiving said current field data and extracting a low-frequency component thereof, second extracting means for extracting said low-frequency component of said composite data, subtracting means for subtracting output data of said first and second extracting means, and adding mans for adding up output of said subtraction means and said composite data, and said first inhibiting means includes isolating means for electrically isolating said output of said subtraction means from input in said adding means in response to said inhibiting signal.

11. An apparatus in accordance with claim 1, wherein said second inhibiting means includes:
noise detecting means for receiving said current field data supplied from said conversion means, for detecting noise received from said current filed data train and for generating an inhibiting signal for applying the same to said first means of said switching means when said noise is present, and
extracting means for extracting said first data from an output data train from said switching means and supplying the same to said low-frequency replacement means.

12. An apparatus in accordance with claim 11, wherein
said first inhibiting means further comprises selective means for receiving said current field data and said first data from said first means of said switching means and for selectively applying either said current field data or said first data to said low-frequency replacement means in response to said inhibiting signal.

13. An apparatus in accordance with claim 1, wherein said first inhibiting means includes:
nonlinear processing means for receiving said current field data from said conversion means and for performing predetermined nonlinear processing, and
noise detecting means for detecting high-order bits of output data from said nonlinear processing means and for detecting presence/absence of said noise in response to the values of said detected high-order bits.

14. An apparatus in accordance with claim 9 or 11, wherein
said switching means includes:
subtracting means for performing subtraction of said data preceding by four fields included in said feedback data and said current field data, p2
first data deriving means for mixing said current field data with output from said subtraction means for deriving said first data, and
replacement means for receiving output from said first data deriving means and said feedback data for replacing said data preceding by four fields included in said feedback data by said first data,
said first data deriving means applying said data preceding by four fields to said replacement means as said first data in response to generation of a low-frequency replacement inhibiting signal.

15. A method of reproducing a high definition video signal from a subsampled video signal obtained by band-compressing said high definition video signal in a time compressed integration Sub-Nyquist encoding system, said method comprising:
a step of converting said subsampled video signal to digital data and deriving digital data of a current field;
a step of receiving feedback data in which digital data preceding by two fields and digital data preceding by four fields with respect to current field digital data are alternately arranged and said data of the current field and replacing said digital data preceding by four fields by first data corresponding to said current field data for outputting a data train in which said first data and said data preceding by two fields are alternately arranged;
a step of receiving at least by said first data and performing intrafield interpolation processing for deriving motion picture data;
a step of receiving data formed by said first data and said data preceding by two fields and performing interfield interpolation processing for deriving still picture data;
a step of composing said still picture data and said motion picture data for deriving composite data;
a step of replacing a low-frequency component of said composite data by a low-frequency component of said current field data; and
a step of inhibiting said low-frequency replacement upon generation of noise including dropout in said subsampled video signal.

16. A method in accordance with claim 15, wherein said low-frequency replacement inhibiting step includes a step of delaying a detection signal indicating generation of said noise by a predetermined time for inhibiting said low-frequency replacement, said delay time corresponding to a time up to derivation of said composite data from said current field data.

17. A method in accordance with claim 15, wherein said step of inhibiting said low-frequency replacement includes a step of inhibiting said low-frequency replacement for a period longer than a period in which a signal detecting generation of said noise is supplied, in response to a noise generation detecting signal.

18. A method in accordance with claim 15, wherein said low-frequency replacement inhibiting step includes a step of inhibiting replacement of said data preceding by four fields included in said feedback data and said first data corresponding to said current field data, in response to a detection signal indicating said generation of said noise.

19. A method in accordance with claim 15, wherein said low-frequency replacement inhibiting step includes a step of extracting said first data from a data train formed by said first data and said data preceding by two fields and performing replacement of said low-frequency component of said composite data by said extracted first data,
said first data being replaced by said data preceding by four fields in occurrence of said dropout.

20. A method in accordance with claim 15, wherein said low-frequency replacement inhibiting step includes:
a step of detecting presence/absence of said noise from said current field data,
a step of inhibiting replacement of said data preceding by four fields and said first data in response to noise detection, and
a step of inhibiting replacement of said low-frequency component of said current field data and said low-frequency component of said composite data in response to noise detection.

21. A method in accordance with claim 15, wherein said low-frequency inhibiting step includes:
a step of detecting presence/absence of noise from said current field data,
a step of inhibiting replacement of said data preceding by four fields and said first data in response to noise detection,
a step of extracting said first data from a data train formed by said first data and second data, and
a step of replacing said low-frequency component of said composite data by said low-frequency component of extracted first data,
said extracted first data being replace by said data preceding by four fields in response to said noise detection.

* * * * *